(12) United States Patent
Mann

(10) Patent No.: US 9,507,441 B2
(45) Date of Patent: Nov. 29, 2016

(54) ELECTRONIC STYLUS WITH LOW SKEW TIP FOR CAPACITIVE TOUCH SCREENS

(71) Applicant: John C. Mann, Cave Creek, AZ (US)

(72) Inventor: John C. Mann, Cave Creek, AZ (US)

(73) Assignee: JCM Electronic Stylus LLC, Cave Creek, AZ (US)

( * ) Notice: Subject to any disclaimer, the term of this patent is extended or adjusted under 35 U.S.C. 154(b) by 0 days.

(21) Appl. No.: 14/179,137

(22) Filed: Feb. 12, 2014

(65) Prior Publication Data

US 2014/0160091 A1    Jun. 12, 2014

Related U.S. Application Data

(63) Continuation-in-part of application No. 13/607,051, filed on Sep. 7, 2012.

(60) Provisional application No. 61/532,216, filed on Sep. 8, 2011, provisional application No. 61/639,951, filed on Apr. 29, 2012, provisional application No. 61/766,542, filed on Feb. 19, 2013, provisional application No. 61/790,214, filed on Mar. 15, 2013.

(51) Int. Cl.
*G06F 3/0354* (2013.01)
*G06F 3/044* (2006.01)
*G06F 3/038* (2013.01)

(52) U.S. Cl.
CPC ......... *G06F 3/03545* (2013.01); *G06F 3/0383* (2013.01); *G06F 3/044* (2013.01)

(58) Field of Classification Search
CPC ..... G06F 3/033; G06F 3/044; G06F 3/03545
See application file for complete search history.

(56) References Cited

U.S. PATENT DOCUMENTS 4,186,373 A * 1/1980 Thompson ............... G01V 1/38
                                                               181/108
5,488,204 A    1/1996 Mead et al.
(Continued)

FOREIGN PATENT DOCUMENTS

WO    2012/087858    6/2012
WO    WO 2012/087858    6/2012

OTHER PUBLICATIONS

W. MArshall Leach, Professor GIT, Analog Electronics Course ECE3050, Class notes—Ideal Operational Amplifeirs (op Amp ) Circuits, Summer 2010.*

(Continued)

*Primary Examiner* — Dwayne Bost
*Assistant Examiner* — Robert Michaud
(74) *Attorney, Agent, or Firm* — Booth Udall Fuller, PLC

(57) ABSTRACT

An electronic stylus to be used with a capacitive touch screen includes a tip portion having an electrically conductive tip and an electrically conductive supporting rod attached to the tip. The tip portion further includes a first electrical shielding tube enclosing and shielding the supporting rod and a second electrical shielding tube enclosing the first electrical shielding tube and the supporting rod. The electrical stylus further includes a circuit coupled to the supporting rod to integrate and amplify a current induced at the tip and an electrical conductive housing to house the circuit therein. The first electrical shielding tube and the second electrical shielding tube are to reduce skew effect between the supporting rod and a surface of a touch screen when the electronic stylus is held against the surface of the touch screen.

17 Claims, 22 Drawing Sheets

(56) References Cited

U.S. PATENT DOCUMENTS

| | | | |
|---|---|---|---|
| 5,942,733 A | 8/1999 | Allen et al. | |
| 6,201,442 B1* | 3/2001 | James | H03F 1/083 330/107 |
| 6,506,983 B1 | 1/2003 | Babb et al. | |
| 6,539,797 B2 | 4/2003 | Livingston et al. | |
| 7,612,767 B1 | 11/2009 | Griffin et al. | |
| 7,626,622 B2 | 12/2009 | Kasuga et al. | |
| 7,652,487 B2 | 1/2010 | Schulz et al. | |
| 8,125,469 B2 | 2/2012 | Badaye et al. | |
| 8,199,132 B1* | 6/2012 | Oda | G06F 3/03545 178/19.03 |
| 8,564,553 B2 | 10/2013 | Yeh et al. | |
| 2001/0033274 A1 | 10/2001 | Ong | |
| 2006/0227121 A1 | 10/2006 | Oliver | |
| 2008/0036037 A1* | 2/2008 | Woo | H01F 17/0006 257/546 |
| 2008/0150917 A1 | 6/2008 | Libbey et al. | |
| 2010/0006350 A1* | 1/2010 | Elias | G06F 3/044 178/18.06 |
| 2010/0213252 A1 | 8/2010 | Lapstun et al. | |
| 2010/0225614 A1 | 9/2010 | Sung | |
| 2011/0181630 A1 | 7/2011 | Smith et al. | |
| 2011/0273400 A1 | 11/2011 | Kwon et al. | |
| 2012/0026127 A1 | 2/2012 | Kim | |
| 2012/0062521 A1 | 3/2012 | Ahn et al. | |
| 2012/0086664 A1 | 4/2012 | Leto | |
| 2012/0154340 A1* | 6/2012 | Vuppu | G06F 3/044 345/179 |
| 2012/0161846 A1 | 6/2012 | Ningrat | |
| 2012/0223919 A1 | 9/2012 | Lin et al. | |
| 2012/0327041 A1 | 12/2012 | Harley et al. | |
| 2012/0327042 A1 | 12/2012 | Harley et al. | |
| 2013/0002606 A1 | 1/2013 | Mann | |
| 2013/0106718 A1 | 5/2013 | Sundara-Rajan | |
| 2013/0106766 A1 | 5/2013 | Yilmaz et al. | |

OTHER PUBLICATIONS

International Search Report mailed Apr. 9, 2013, for International Application No. PCT/US2012/067897, 4 pages.

International Search Report adn Written Opinion for PCT/US12/67897 dated Apr. 9, 2013.

International Search Report and Written Opinion mailed Aug. 22, 2014, for International Patent Application No. PCT/US2014/016444, 12 pages.

\* cited by examiner

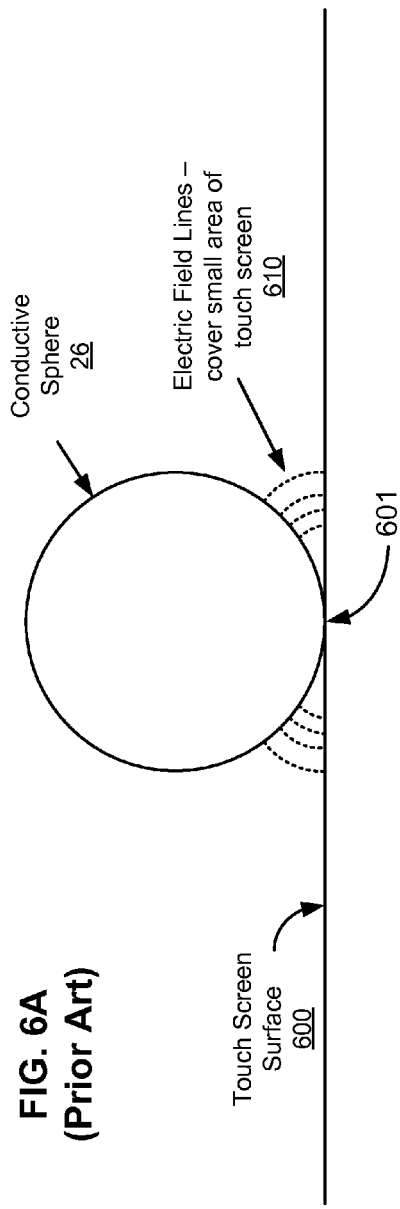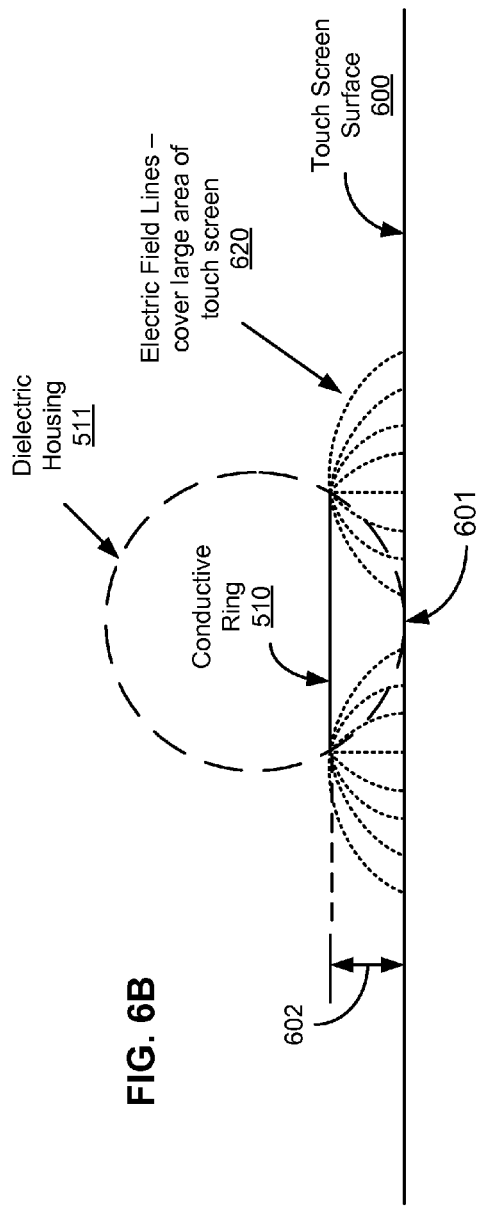
FIG. 6A (Prior Art)
FIG. 6B

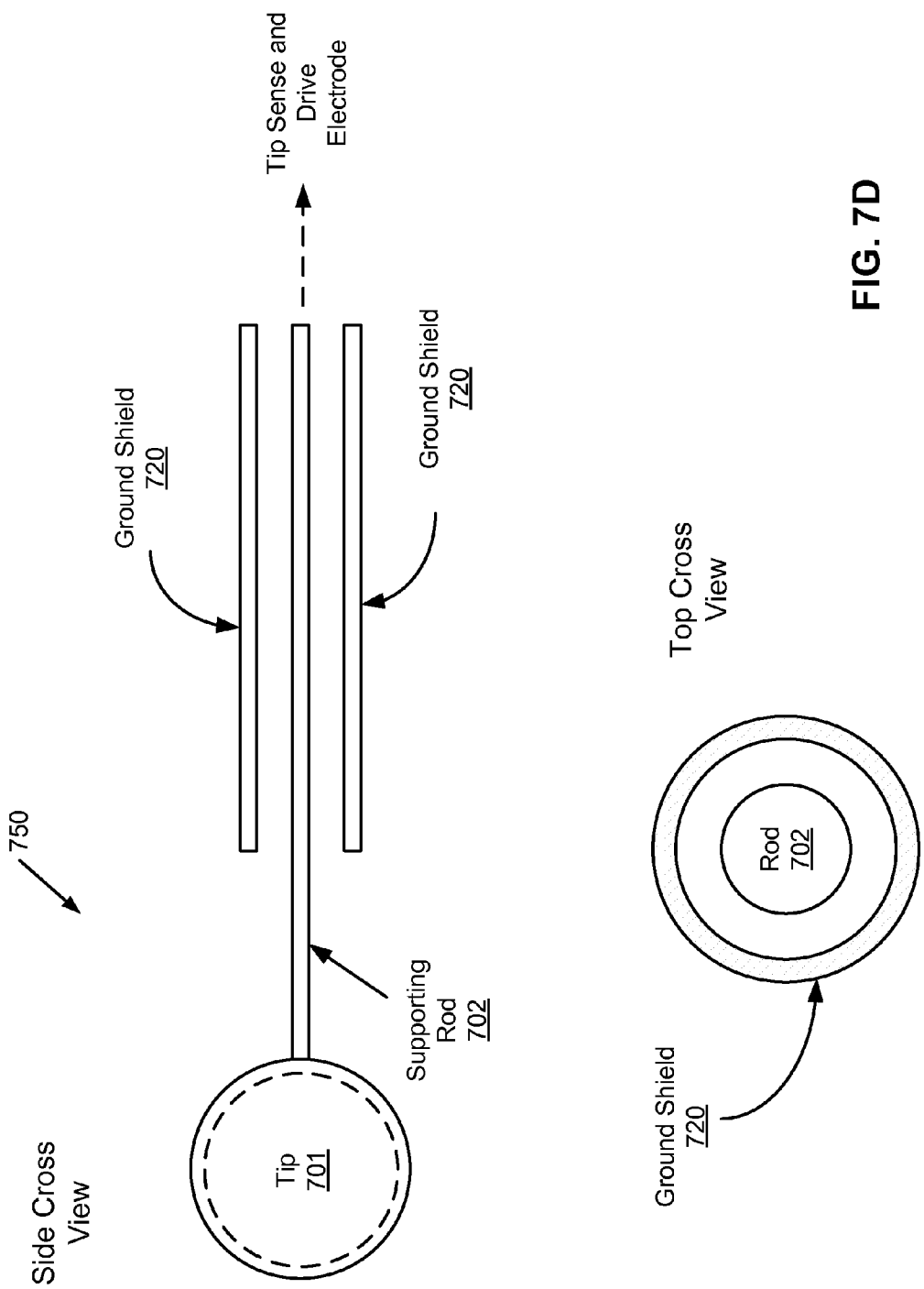

ELECTRONIC STYLUS WITH LOW SKEW TIP FOR CAPACITIVE TOUCH SCREENS

RELATED APPLICATIONS

This application is continuation-in-part (CIP) of U.S. patent application Ser. No. 13/607,051, filed Sep. 7, 2012, which claims the benefit of U.S. Provisional Patent Application No. 61/532,216, filed Sep. 8, 2011 and U.S. Provisional Patent Application No. 61/639,951, filed Apr. 29, 2012. This application also claims the benefit of U.S. Provisional Patent Application No. 61/766,542, filed Feb. 19, 2013 and U.S. Provisional Patent Application No. 61/790,214, filed Mar. 15, 2013. The disclosures of the above-identified applications are incorporated by reference herein in their entirety.

FIELD OF THE INVENTION

Embodiments of the present invention relate generally to electronic styluses for capacitive touch screens. More particularly, embodiments of the invention relate to an electronic stylus with a low skew tip for capacitive touch screens.

BACKGROUND

Recently, as touch screens that can replace independent input devices, such as a keyboard and a mouse, by converting positions directly contacting a person's hand or an object into electrical signals, on the front face of image display devices are increasingly used, possible uses of stylus pens for the touch screen panels are rapidly increasing. A stylus pen is usually designed to be thin relative to a person's hands, and particularly, the tip portion for touch input is designed to be thin, such that it is useful to perform precise input to the touch panel. However, there is a limit to the extent to which it is possible to make the tip portion of the stylus pen thin and still be useful, particularly in a stylus pen used for a capacitive type touch panel. A sufficient area of the tip portion is required to provide capacitance change for the capacitive type touch panel so that the capacitance touch panel is able to sense touch input. Therefore, a stylus pen to provide touch input to a capacitive type touch panel has a relatively large area at the tip portion, such that the stylus pen covers the portion where touch input is applied to the screen. Such a configuration is sometimes inconvenient.

Coordinates of the small conductive ball tip of certain embodiments of the stylus as registered by a capacitive touch screen (CTS) may not be exact. For example, if one slowly draws a diagonal line on the CTS, the line may produce small back and forth lines that may appear to be "Wiggles." The amplitude of the Wiggles may vary from one CTS to the next. The coordinate registration error may be due to the CTS having a fairly widely spaced drive and sense electrodes. For example, the Apple® iPad™ CTS has electrodes spaced approximately 4 millimeters (mm). In some situations, the CTS may be designed to register a finger pushed flat against the screen. Thus in those situations, such a large area will span perhaps 5 to 10 mm. The centroid finding algorithm of the CTS's interface integrated circuits works may then prefer that large area of significant coupling capacitance. When the CTS only detects the small electrostatic footprint of, for example, a ⅛ inches (") diameter metal ball, as may be used in certain types of a stylus, the centroid finding algorithm may provide inexact coordinates.

Further, a tip or tip portion for a stylus may include a smooth conductive ball at the end of a rod constructed in conductive material such as metal or conductive polymer. The rod may connect the conductive ball to an input stage of the stylus. Various lengths of the supporting rod could be used on various embodiments. A longer supporting rod may increase the "skew" experienced when using the stylus. In some situations, the stylus may be held at a usual writing or drawing angle. This may result in the coordinates that are registered by the touch screen being "pulled" away from a location directly below the ball tip, towards the body of the stylus. This may occur due to the addition of the desired sensing and driving of the electrodes of the CTS by the tip ball, the supporting rod may be seen, in an electrostatic sense, by the CTS electrodes.

BRIEF DESCRIPTION OF THE DRAWINGS

Embodiments of the invention are illustrated by way of example and not limitation in the figures of the accompanying drawings in which like references indicate similar elements.

FIGS. 6A and 6B are block diagrams illustrating different electrical field line effects using different types of tips.

FIGS. 7A-7F are block diagrams illustrating examples of tip portions of a stylus according to certain embodiments of the invention.

DETAILED DESCRIPTION

Figure 1:
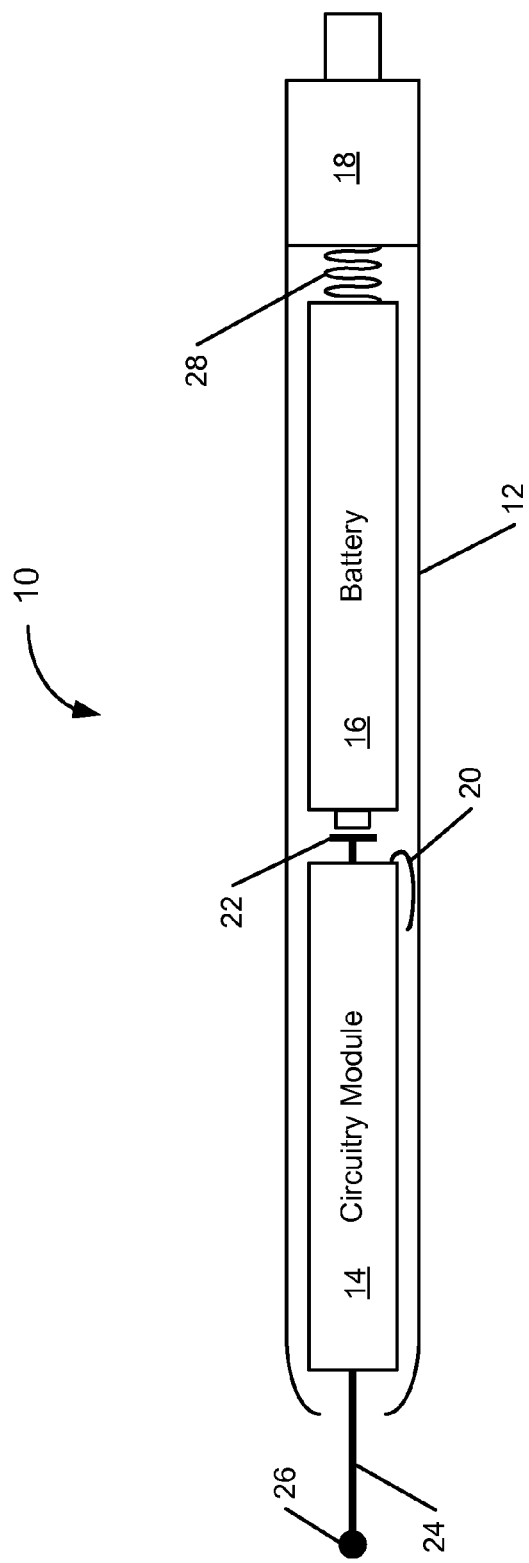
FIG. 1 is a block diagram illustrating an example of an electronic stylus according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to one aspect of the invention, a stylus may be designed by moving the conductive material away some distance from a touch screen surface, allowing the electric field lines to spread out more than in a configuration where the conductive ball may be directly touching the CTS surface. In one embodiment, a tip of the stylus may include a ring of conductive material such as metal or conductive polymer having an approximately 3/32" in diameter which is inside a low-k dielectric sphere, preferably hollow, of an approximately 1/8" diameter. When the stylus is held in a manner such that the plane of the conductive ring is parallel to the plane of the CTS surface, the ring may be positioned about 1/32" above the CTS surface.

In another embodiment, the diameter of the conductive ring may vary according to the diameter of the low-k dielectric sphere. Furthermore, the metal ring may be any distance away from the dielectric sphere according to the dimension of the stylus. Thus any dimension may be utilized dependent on the design of the stylus. Electric field lines may stretch from the ring outward and inward to the CTS surface over a wide area, and the capacitive signature as seen by the CTS centroid finding algorithm may be large enough to provide coordinates with reduced error, which may essentially be the same as when using a finger. Thus, the end result may be that there is improved accuracy in the stylus. In some embodiments, it may be useful if the stylus is held in such a way that the metal ring is substantially parallel to the CTS surface. In one embodiment, the body of a stylus may be designed in an oval shape rather than circular to induce the user to hold the stylus in a particular manner. Thus, the stylus may sit naturally in the hand of the user at a position to possibly position the ring in a preferable orientation (e.g., parallel to the CTS surface).

According to another aspect of the invention, a supporting rod of a stylus may be shielded with a cylindrical conductor (e.g., tubular conductive layer) to reduce skew effects on the touch screen. Thus, electric field lines from the supporting rod may largely end on the shielding cylindrical conductor rather than on the CTS electrodes. In one illustrative embodiment, a single cylindrical conductor may be placed around and enclosing the supporting rod connected to the stylus circuit output. In one embodiment, to reduce oscillation because of positive feedback from the shield to the tip support rod a stylus circuit ground shell is inserted between the outer shell and the tip support rod.

According to another aspect of the invention, an electrical circuitry of a stylus may employ a single operational amplifier (op-amp) with a capacitor coupled to a negative input and an output of the op-amp, forming an integrator, while at least one resistor coupling the output and a positive input of the op-amp may set the amount of a positive feedback. In one embodiment, the charge induced at the tip by a positive-going transition of a touch screen drive line may integrate onto the capacitor, which may drive the op-amp output in a negative direction. The positive feedback network may regeneratively amplify a change at the op-amp output, possibly causing the op-amp output to swing negatively in a certain amount. This swing may couple back through the capacitor to the tip, which may bring the tip voltage a certain amount lower than before the drive line transition. Thus, the negative-going change at the tip caused by a positive-going drive line transition is able to correct the "sensing" of an electronic stylus. In addition, the stylus body may also be connected to the circuit ground. According to another embodiment, a circuit may employ a non-inverted single op-amp that may amplify the voltage induced onto the capacitor by drive line transitions. Resistors may set the gain of the non-inverting op-amp, while the stylus body may be connected to the op-amp output.

FIG. 1 is a block diagram illustrating an example of an electronic stylus according to one embodiment of the invention. FIG. 1 shows an example cross section of a stylus assembly 10 for a capacitive touch screen. Referring to FIG. 1, stylus assembly 10 includes a barrel 12. Barrel 12 may be manufactured of electrically conductive material such as metal, an electrically conductive polymer, or other material capable of capacitively coupling changes in voltage at connector 20 (or other suitable connection) with the body of a person holding stylus assembly 10. Battery 16 may be any battery form, and any number of batteries depending on the desired stylus shape and desired voltage level. In this example, an AAA alkaline penlight battery is used. Battery 16 may be rechargeable. A battery charge circuit and charge status LED (not shown) may be included in assembly 10. As discussed in detail below, battery 16 provides power to circuitry module 14 for operating the stylus assembly. Note that battery 16 is optional in certain situations. For example, stylus assembly 10 may be powered by an external power source (e.g., with an AC or DC adapter). Battery 16 may be charged by charging circuitry (not shown) coupled to the external power source. Such a configuration may be useful when the stylus is heavily used.

Switch 18 may be implemented to complete or interrupt the power supply from the battery 16 to the circuitry module 14. Switch 18 may take any form depending on the particular configuration of the stylus and the desired design. Switch 18 may be a traditional penlight push-button switch as shown in FIG. 1. Contact 22 provides electrical connection between the positive pole of battery 16 and circuitry module 14. Spring contact 28 provides electrical connection between the negative pole of battery 16 and switch 18, which is then connected to the power supply ground and stylus circuitry output (not shown) of circuitry module 14 via the conductive housing or stylus body 12 of the stylus 10. Of course, other battery connections and switch configurations may be implemented depending on the particular geometric configuration of the stylus.

Stylus assembly 10 includes a tip portion having tip 26 and supporting rod 24, where tip 26 is electrically coupled to and supported by supporting rod 24. Supporting rod 24, which is made of conductive material (e.g., metal), forms electrical connectivity to stylus circuitry 14. Tip 26 may comprise a variety of configurations including but not limited to a ball point, a ring tip, a fine tip or other low contact area geometry. Tip 26 may comprise a metal, an electrically-conductive polymer, or a combination of both. Tip 26 may be coated with TEFLON or other suitable material to prevent scratching the surface of the touch screen. In one embodiment a diameter of tip 26 is less than 3 mm. A larger diameter may also be utilized.

Figure 2A:
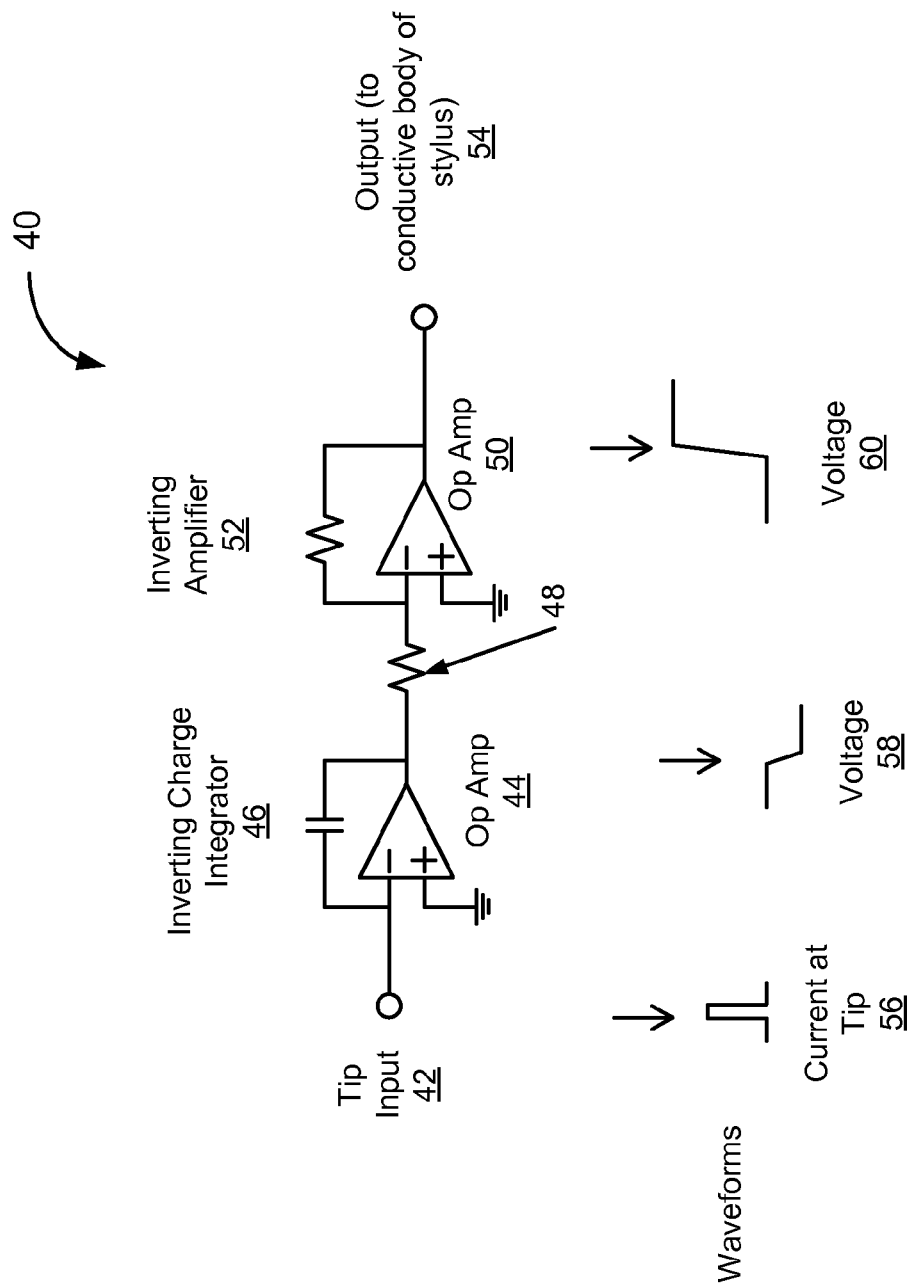
FIGS. 2A-2C are schematic diagrams illustrating examples of stylus circuits according to certain embodiments of the invention.
Figure 2B:
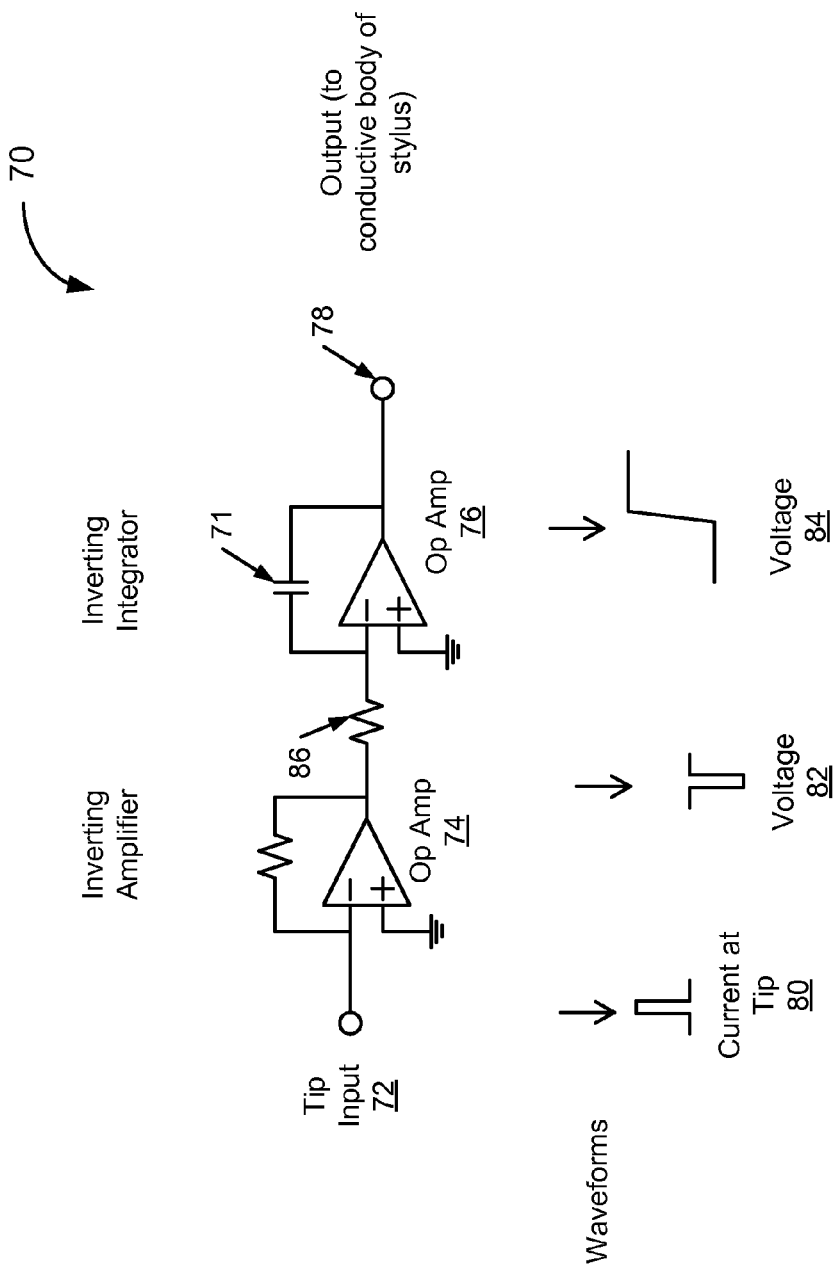
Figure 2C:
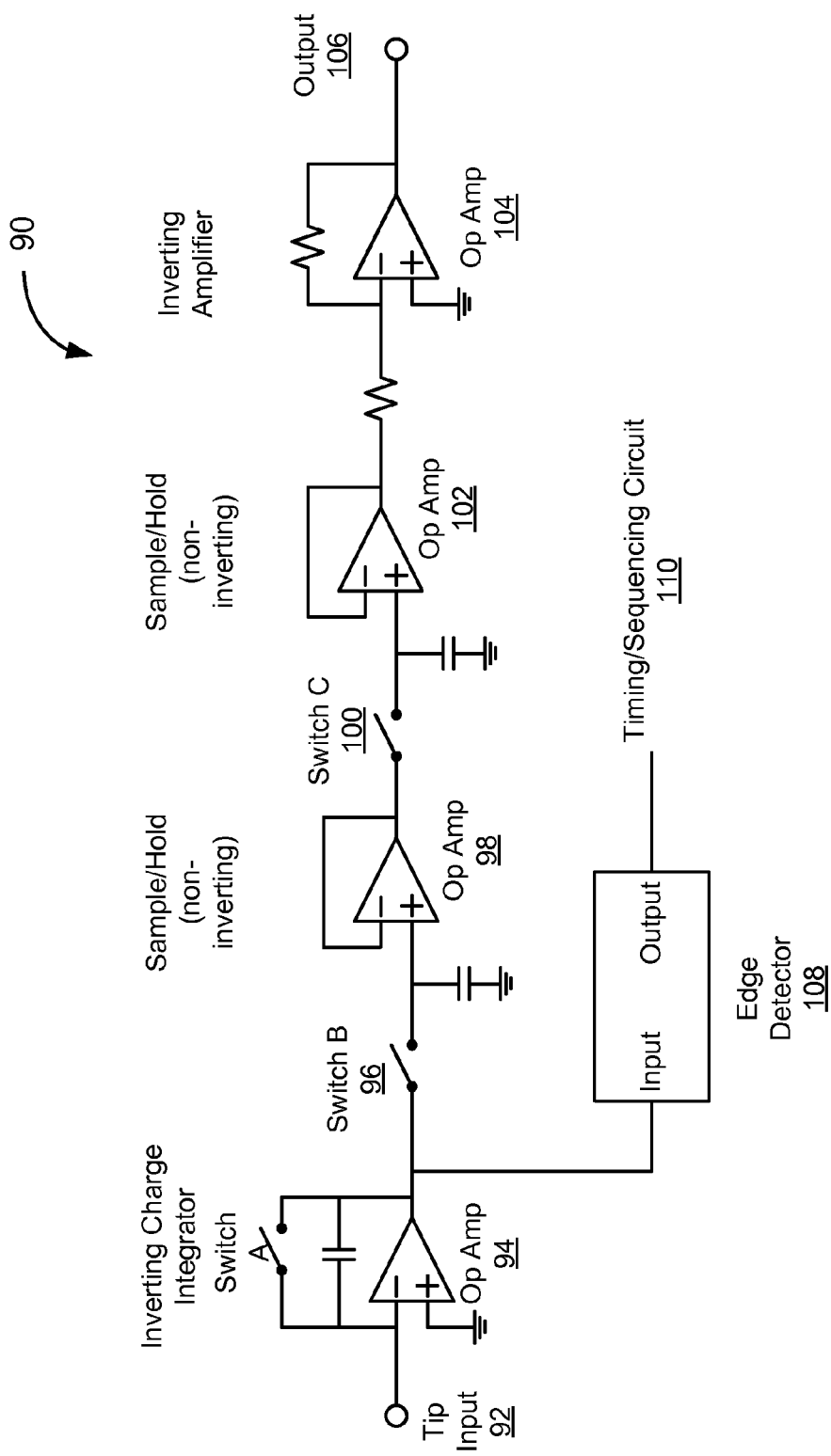

FIGS. 2A-2C are schematic diagrams illustrating examples stylus circuitry according to certain embodiments of the invention. For example, the circuitries as shown in FIGS. 2A-2C may be implemented as part of circuitry module 14 illustrated in FIG. 1. The circuitry as shown in FIGS. 2A-2C may comply with the following transfer function:

$$V_{out} = A \cdot \int I(\text{in}) dt$$

Where $V_{out}$ is the voltage output of the circuit connected to the conductive body of the stylus assembly 12; A is the amplifier gain of the circuit with dimensions of inverse farads; and I(in) is the input current at tip 26 induced from the capacitive coupling tip of 26 with the capacitive touch screen during a drive line transition.

Referring to FIG. 2A, schematic 40 includes tip input 42 connected to an inverting charge integrator comprising operational amplifier 44 and capacitor 46. Op-amp 44 may be, for example, MICREL Part No. MIC921. In this example, capacitor 46 may be in the range of approximately 2-10 pico-farads (pF). The output of the inverting charge integrator is input into an inverting amplifier having op-amp 50, resistor 52, and resistor 48. In this example, resistor 52 is in the range of approximately 5-20 kilo-ohms (kΩ), and resistor 48 is in the range of approximately 1-5 kΩ. The ratio of resistor 52 to resistor 48 defines the gain of the inverting amplifier. This ratio may be adjusted to generate an appropriate output voltage for operation of the stylus with a plurality of different capacitive touch screen configurations. The gain may also be adjusted to reduce or eliminate oscillation. Operational amplifier 50 may be, for example, Linear Technologies® Part No. LT 1354, having an output in the range of +/−10 volts.

Output of inverting operational amplifier 50 may be connected to the body or external surface of stylus barrel 12 via connector 20 illustrated in FIG. 1. Other connections between stylus circuitry output and the stylus barrel exterior 12 may be implemented. For example, a direct contact may be established between the circuitry module exterior (to which the circuitry output may be connected) and the interior of barrel 12. Alternatively, a portion of the circuitry module 14 connected to the circuitry output may be threaded for physically and electrically attaching to the stylus housing. Other contact configurations may be implemented.

Waveform 56 shows a current spike generated at tip 42 resulting from a positive transition of drive line voltage at the touch screen (not shown). Inverting charge integrator 44 outputs a downward voltage transition 58 that is proportional to the charge induced at the tip 42. Inverting amplifier 50 outputs an amplified positive voltage transition 60 to the conductive external surface of the barrel 12 that is proportional to the input voltage drop 58. Circuit 40 may require shielding to prevent oscillation caused by detection at inverting input of operational amplifier 44 of the voltage output to stylus body 12 via contact 20 illustrated in FIG. 1.

FIG. 2B illustrates an alternative schematic 70 for circuitry module 14 illustrated in FIG. 1. Example schematic 70 includes tip input 72 connected to the input of an inverting transimpedance amplifier 74. The output of transimpedance amplifier 74 is connected to an inverting integrator 70 composed of resistor 86, operational amplifier 76, and capacitor 71. Output of inverting integrator operational amplifier 76 is connected to the body or external surface of stylus barrel 12 via connector 20 illustrated in FIG. 1. Waveform 80 shows a current spike generated at tip 72 resulting from a positive transition of drive line voltage at the touch screen (not shown). Inverting transimpedance amplifier 74 outputs a negative voltage spike 82 that is proportional to the current induced at the tip 42. Inverting integrator 76 outputs an amplified positive voltage transition 84 to the conductive external surface of the barrel 12 that is proportional to the negative voltage spike 82. Circuit 70 may require shielding to prevent oscillation caused by detection at inverting input of operational amplifier 74 of the voltage output to stylus body 12 via contact 20 illustrated in FIG. 1.

FIG. 2C illustrates an alternative schematic 90 for circuitry module 14 illustrated in FIG. 1. Circuit 90 is similar to circuit 40 illustrated in FIG. 2A, with the addition of sample/hold elements 98 and 102, edge detector 108 and timing/sequence circuit 110. The introduction of sample/hold elements 98 and 102 may reduce or eliminate oscillation caused by detection at inverting input of operational amplifier 74 of the voltage output to stylus body 12, thus reducing or eliminating the need for the shielding used with circuit 40. The usefulness of circuit 90 is limited to certain tablet computers which employ touchscreens using a particular timing scheme for the drive and sense lines within the touchscreen. The Apple iPad 1 and iPad 2 are two such tablet computers.

Figure 3:
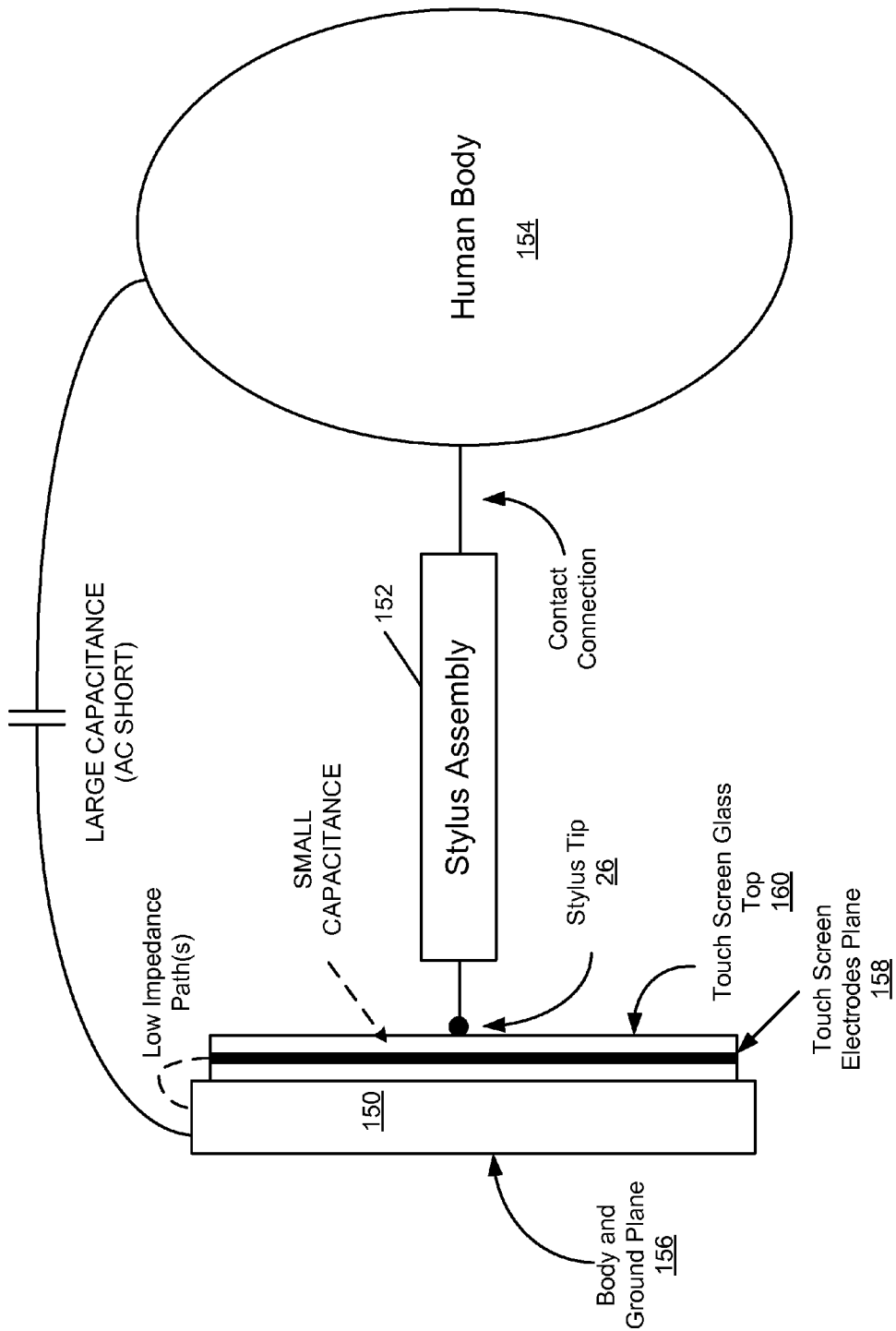
FIG. 3 is a block diagram illustrating an example capacitive circuit formed between a capacitive touch screen, stylus, and a human body.

FIG. 3 is a block diagram illustrating an example capacitive circuit formed between a capacitive touch screen 150, stylus assembly 152 and the body of a person 154 holding the stylus assembly 152. Referring to FIG. 3, touch screen 150 may include a body and ground plane 156, a drive and sense electrode plane 158 and top glass 160. A relatively small capacitance exists between stylus tip 26 and touch screen electrodes 158 (e.g., about 0.6 pF) in comparison to the relatively large capacitance that exists between the human body 154 and the tablet computer as a whole 156 (e.g., about 50 pF). The connection between the human body 154 and the ground plane of the tablet computer may therefore be viewed as an AC short in the capacitive circuit. The potential difference between the human holding the stylus and the tablet computer does not change with time.

Referring to FIGS. 2A and 3, when the electrical potential established by the touchscreen present at tip 26 transitions from a lower potential level to a higher potential level to form a positive transient, after inverting integrator 46 and inverting amplifier 52, the voltage at the output of the inverting amplifier 52 is significantly higher than the voltage at tip 26. For example, the voltage at the output the inverting amplifier 52 may be positive 10 volts relative to the voltage at tip 26. This can be viewed as the voltage potential at tip 26 to be around −10 volts relative to the stylus body (and human body).

Figure 4A:
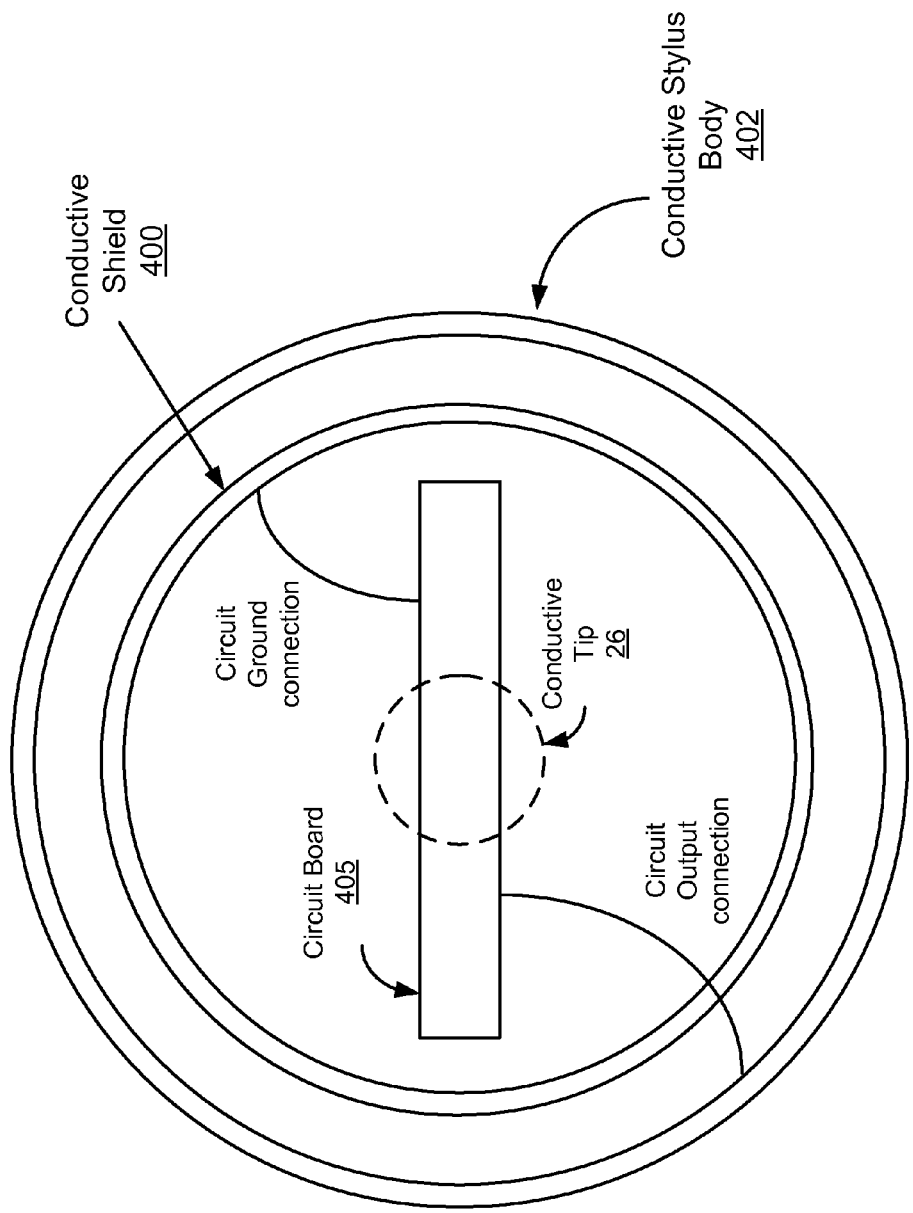
FIGS. 4A-4C are block diagrams illustrating examples of stylus assembly structures according to certain embodiments.
Figure 4B:
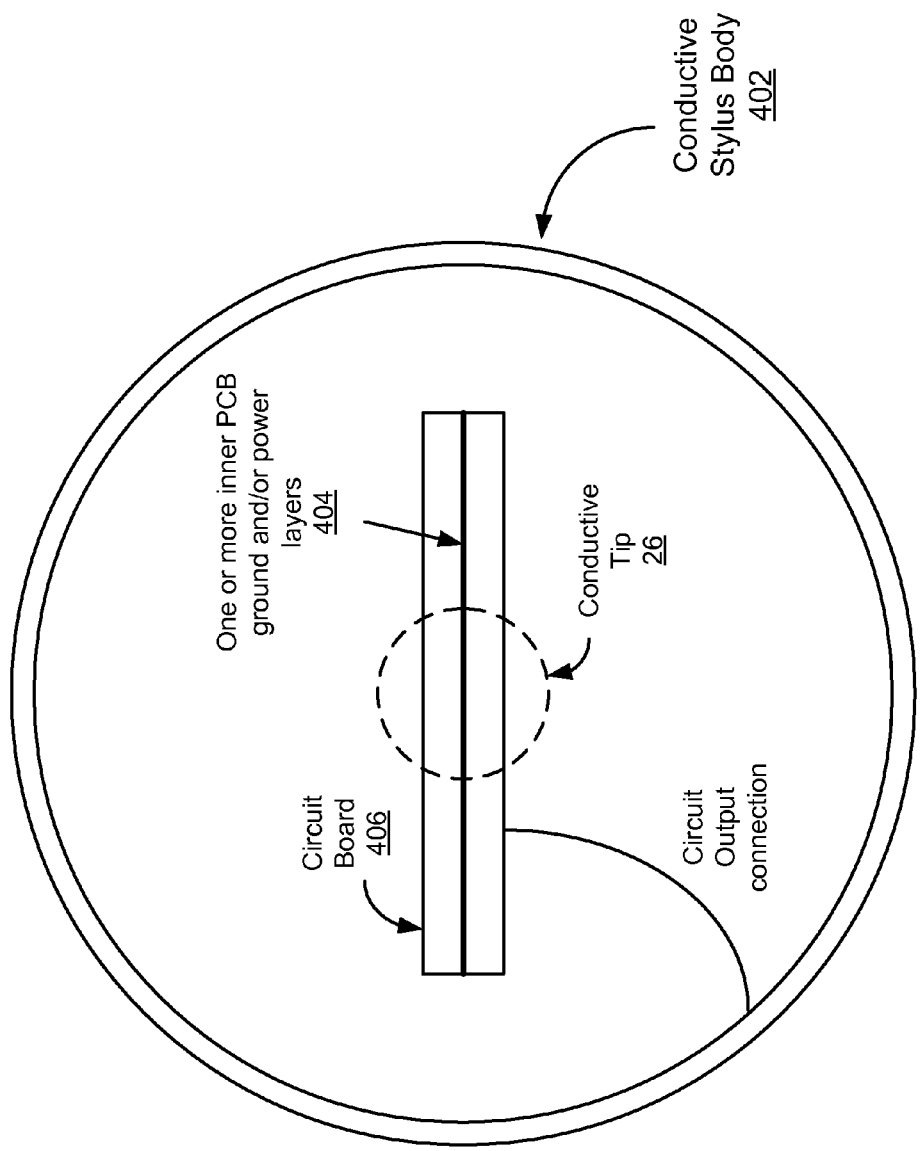
Figure 4C:
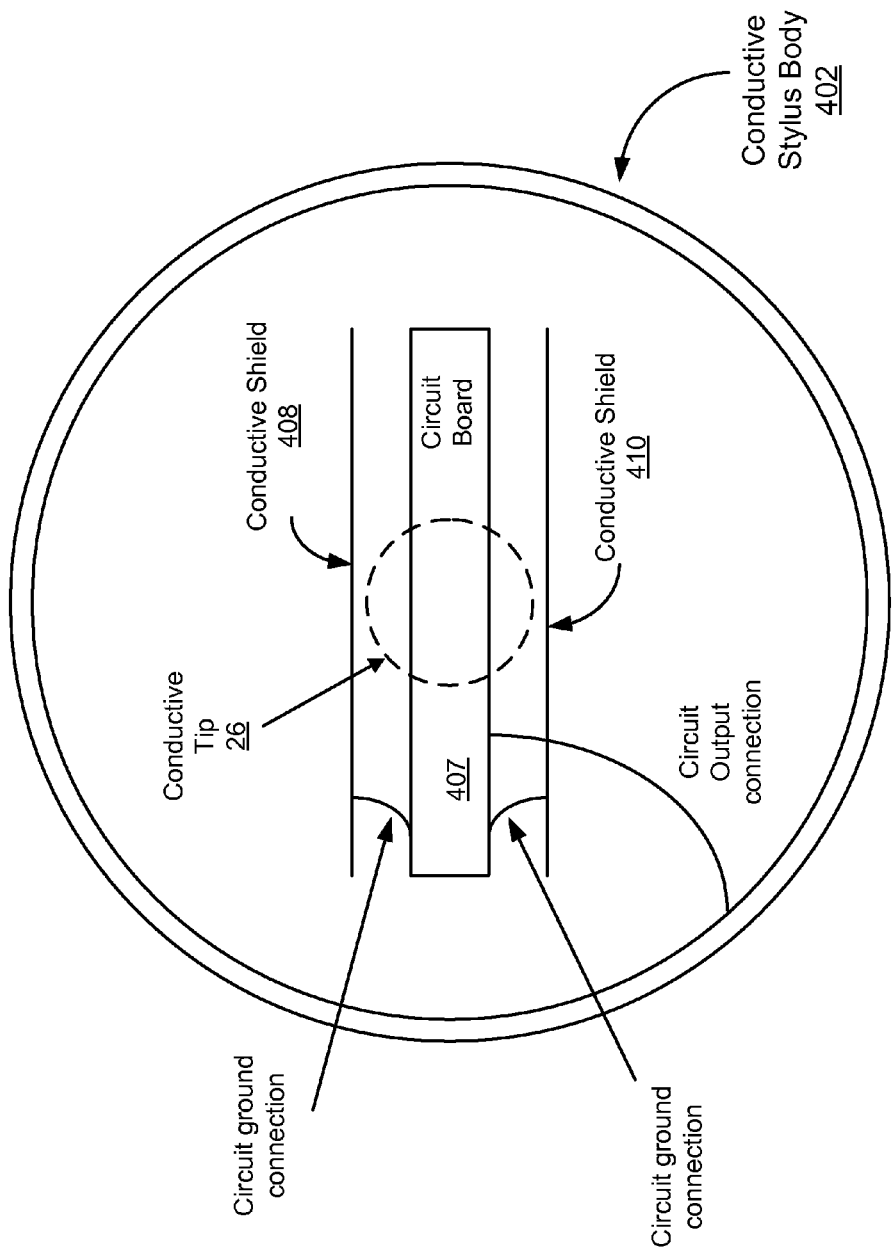

FIGS. 4A-4C are block diagrams illustrating end-view cross-sections of a stylus assembly according to certain embodiments of the invention. The stylus assemblies as shown in FIGS. 4A-4C may be implemented as part of a stylus described in FIG. 1. Referring to FIGS. 4A-4C, the stylus assembly 10 illustrating various configurations for shielding the input to the stylus circuitry, for example, as described in FIGS. 2A and 2B, from the output of the circuitry to prevent oscillation (the sample/hold configuration as disclosed in FIG. 2C may not require shielding). Referring to FIG. 4A, a tubular shielding 400 connected to stylus circuit ground is located concentrically within and spaced between circuit board 405 and stylus barrel 402. In FIG. 4B, one or more printed circuit board (PCB) ground layers or power layers 404 of the stylus circuit board 406 are utilized to shield the stylus circuitry and prevent oscillation. In FIG. 4C, shielding is provided in a parallel plane 408 and/or 410 spaced above and/or below stylus circuitry 407. Other shielding configurations may be implemented for shielding the input circuitry from the circuitry output to prevent oscillation.

Figure 5:
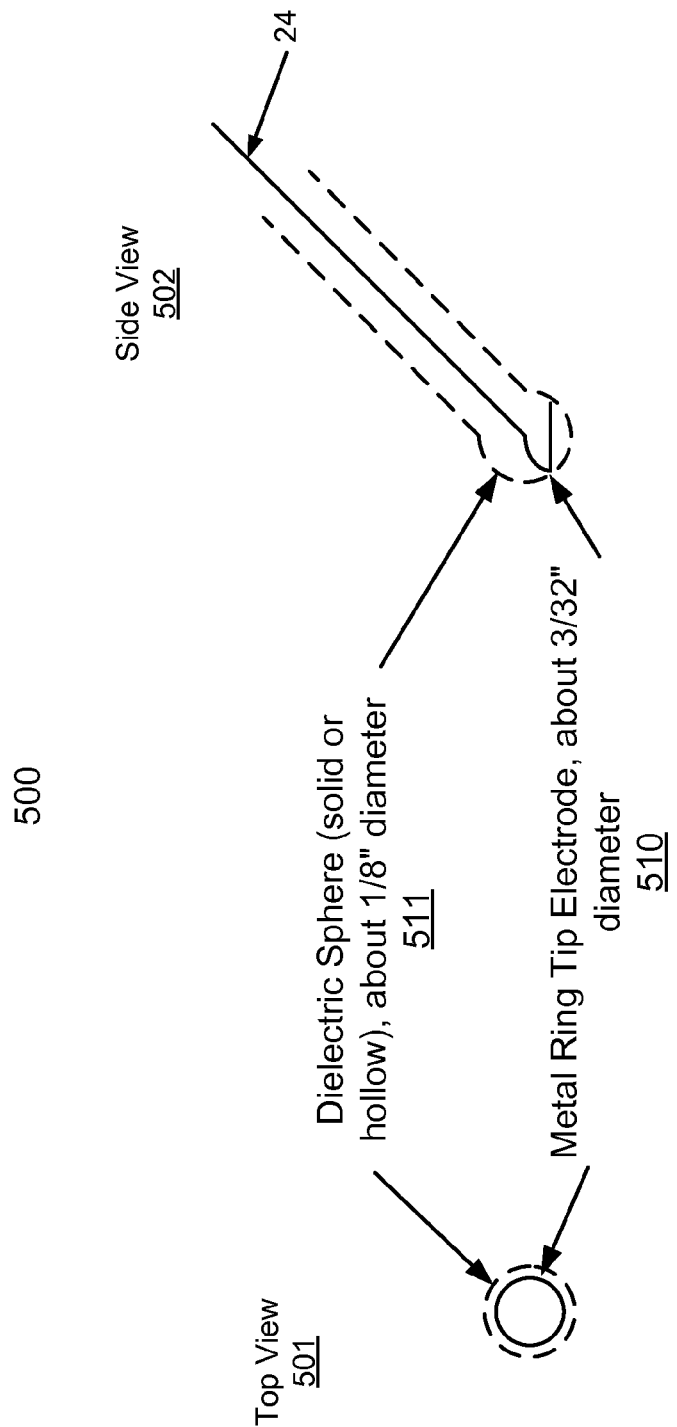
FIG. 5 is a block diagram illustrating an example of a tip portion of a stylus according one embodiment of the invention.

FIG. 5 is a block diagram illustrating an example of a tip portion of a stylus according to one embodiment of the invention. For example, tip portion 500 may be implemented as part of the tip portion having tip 26 and supporting rod of FIG. 1. Referring to FIG. 5, as shown in top view 501 and side view 502, tip portion 500 include a tip 510 and supporting rod 24. In one embodiment, tip 510 includes a ring made from conductive material such as metal or conductive polymer. Unlike tip 26 of FIG. 1, which is in a form of conductive ball, tip 510 may be in a form of conductive ring, covered, insulated or protected by a dielectric material, in this example, dielectric sphere 511, for example, to maintain the conductive ring a constant distance from the touchscreen surface thereby preventing variations in the coupling capacitance.

According to one embodiment, one of the purposes of having a ring shape of tip 510 is to expand the electric field lines to cover a larger area of the touch screen. According to one embodiment, by having a ring tip, a stylus is designed to move the conductive material away from a touch screen surface, as shown in FIG. 6B, allowing the electric field lines to spread out more than in a configuration in which the conductive ball may be directly touching the CTS surface, as shown in FIG. 6A.

Referring to FIG. 6A, where tip 26 is constructed as a conductive ball or sphere. The capacitive coupling area between the ball tip 26 and the touch screen surface 600 is limited to a small region around contacting point 601. As a result, the electric field lines 610 will cover a relatively small area of the touch screen surface 600.

In one embodiment, a tip of the stylus may include a ring of conductive material such as metal or conductive polymer having an approximately 3/32" in diameter which is inside a low-k dielectric sphere, preferably hollow, of an approximately 1/8" diameter. When the stylus is held in a manner such that the plane of the conductive ring is parallel to the plane of the CTS surface 600, the ring may be positioned about 1/32" above the CTS surface 600.

Referring now to FIG. 6B, in this example, the tip of a stylus includes a conductive ring 510 enclosed by dielectric housing 511 (e.g., a sphere). The plane or surface of conductive ring 510, when the corresponding stylus is held by a user, is relatively or substantially parallel to the touch screen surface 600. As a result, the lowest part of the conductive ring is "lifted" away from the touch screen surface 600 as indicate by distance 602. Distance 602 may vary dependent upon the diameter of the conductive ring 510. Since the tip is in a ring shape, the electrical charges of the tip will not be concentrated at center; rather, the charges will be distributed along the perimeter of the conductive ring 510. As a result, the electric field lines 620 generated by conductive ring 510 will cover a relatively large area of the touch screen surface 600. In one embodiment, when the stylus is held in a manner such that the plane of the conductive ring is parallel to the plane of the CTS surface 600, the ring may be positioned about 1/32" above the CTS surface, as shown as space 602 of FIG. 6B between ring 510 and contacting point 601 of housing 511 and the touch screen surface 600.

In one embodiment, the diameter of the conductive ring 510 may vary according to the diameter of the low-k dielectric sphere 511. Furthermore, the electrically conductive ring 510 may be placed any distance away from the dielectric sphere according to the dimension of the stylus. Thus any dimension may be utilized dependent on the design of the stylus. Electric field lines 620 may stretch from the ring 510 outward and inward to the CTS surface 600 over a wide area, and the capacitive signature as seen by the CTS centroid finding algorithm may be large enough to provide coordinates with reduced error, which may essentially be the same as when using a finger. Thus, the end result may be that there is improved accuracy in the stylus. In some embodiments, it may be useful if the stylus is held in such a way that the electrically conductive ring 510 is substantially parallel to the CTS surface 600. In one embodiment, the body of a stylus may be designed in an oval shape rather than circular to induce the user to hold the stylus in a particular manner. Thus, the stylus may sit naturally in the hand of the user at a position to possibly position the ring 510 in a preferable orientation (e.g., parallel to the CTS surface). Note that the tip 510 may also be implemented as a plate instead of a ring. Note that the tip configurations as shown in FIGS. 5 and 6A-6B can be applied to any of the circuits described throughout this application (e.g., circuits as shown in FIGS. 2A-2C, 8, 10, and 12A).

Figure 7A:
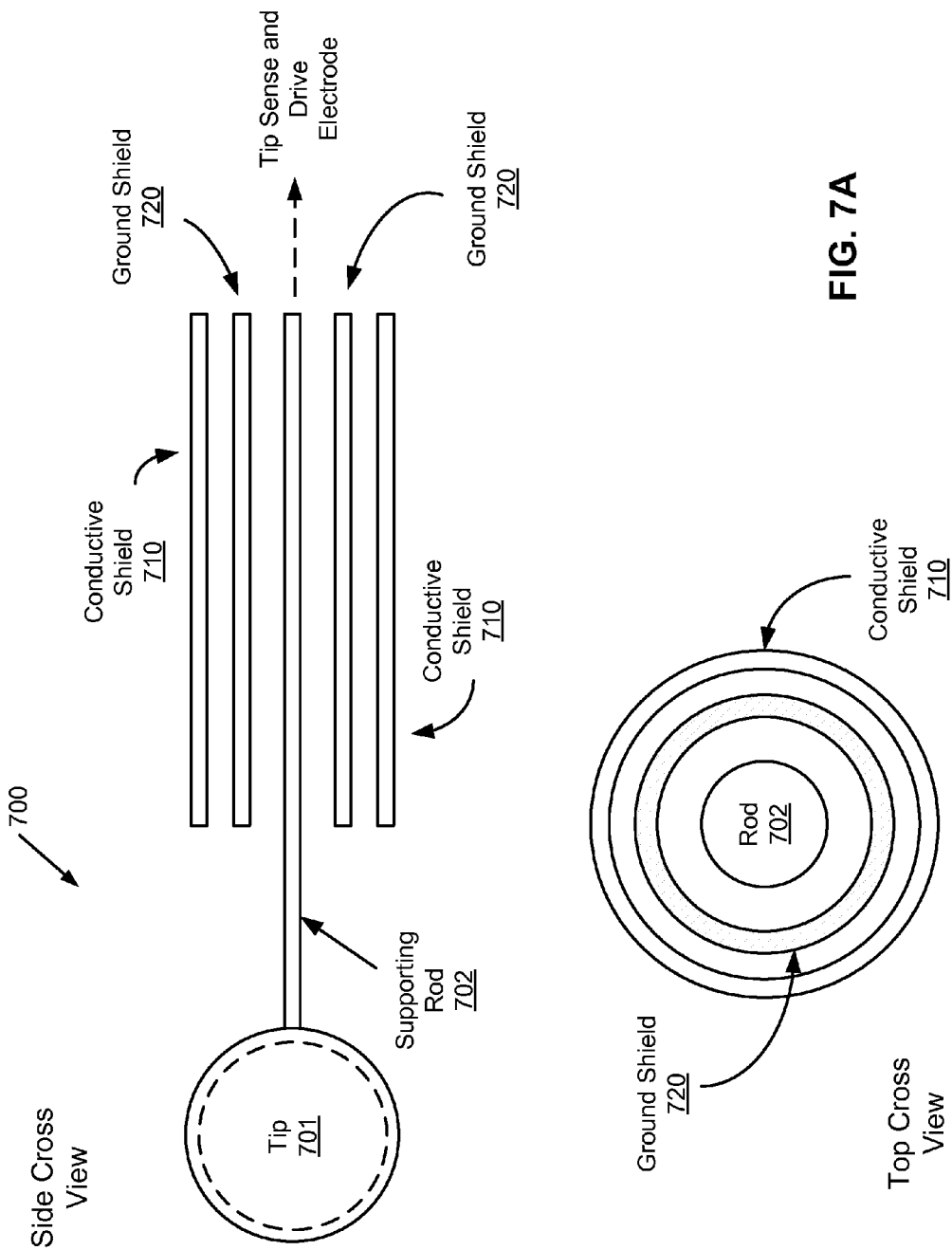
Figure 7C:
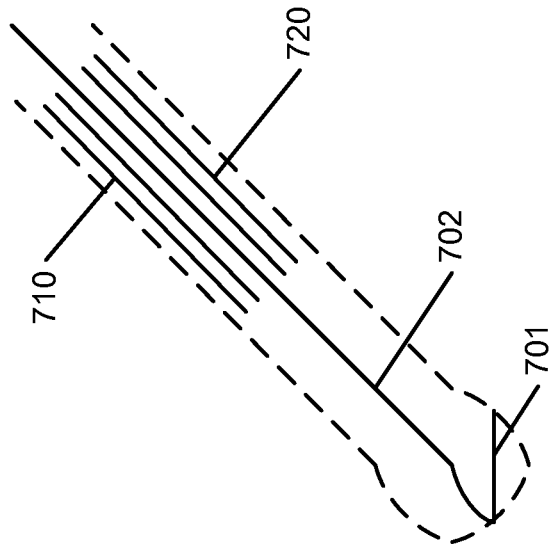
Figure 7B:
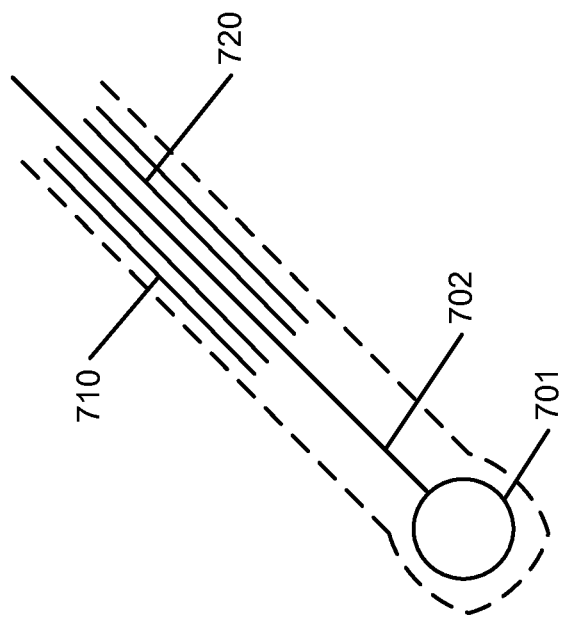

FIGS. 7A-7C are block diagrams illustrating various configurations of a tip portion of a stylus according to certain embodiments of the invention. Tip portion 700 may be implemented as part of the tip portion having tip 26 and support rod 24 of FIG. 1. In one embodiment, the tip portion includes a tip and a supporting rod attached to the tip, the tip and the supporting rod being electrically conductive. The tip portion further includes a first electrical shielding tube enclosing and shielding the supporting rod, and a second electrical shielding tube enclosing the first electrical shielding tube and the supporting rod.

Referring to FIG. 7A, tip portion 700 includes a tip 701 electrically coupled to and supported by a first end of supporting rod 702, while a second end of supporting rod 702 is electrically coupled an input of the stylus circuitry (e.g., circuitry module 14 of FIG. 1). Tip 701 may be in a ball or sphere shape as shown in FIG. 7B, a ring or plate shape as shown in FIG. 7C. As described above, the length of supporting rod 702 may cause the undesirable "skew" effect with respect to a touch screen surface during the usage of the stylus.

According to one embodiment, supporting rod 702 may be shielded with or surrounded by a cylindrical or tubular shield 710 (also referred to as an outer shield) made of conducting material (e.g., metal) to reduce skew effects on the touch screen surface. Thus, electric field lines from the supporting rod 702 may largely end on the cylindrical shield 710 rather than on the CTS electrodes. In one embodiment, a single cylindrical shield, such as, shield 710, may be placed around and enclosing (but insulated from) the supporting rod 701 electrically coupled to an output of the stylus circuit (e.g., outputs 54, 78, or 106 of FIGS. 2A-2C). In one embodiment, to reduce oscillation because of positive feedback from the shield 710 to the tip support rod 702, a stylus circuit ground shell 720 (also referred to as an inner shield) is placed between the outer shell 710 and the tip support rod 702, but is insulated from both. In some embodiments, the tip portion configurations as shown in FIGS. 7A-7C can be utilized with any of the circuits as shown in FIGS. 1, 2A-2C, 9, 10A-10B, and 12A.

Figure 7F:
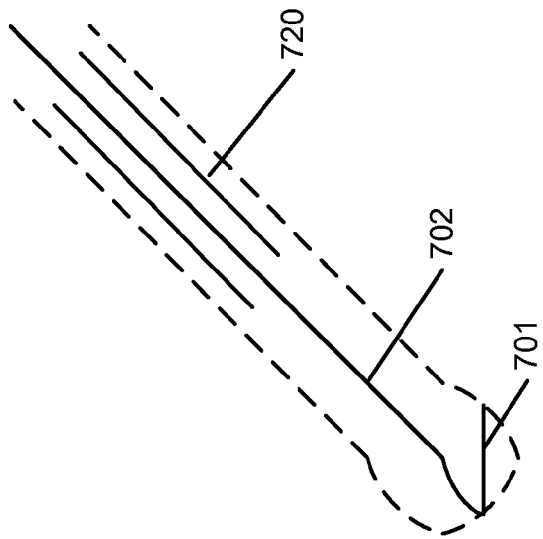
Figure 7E:
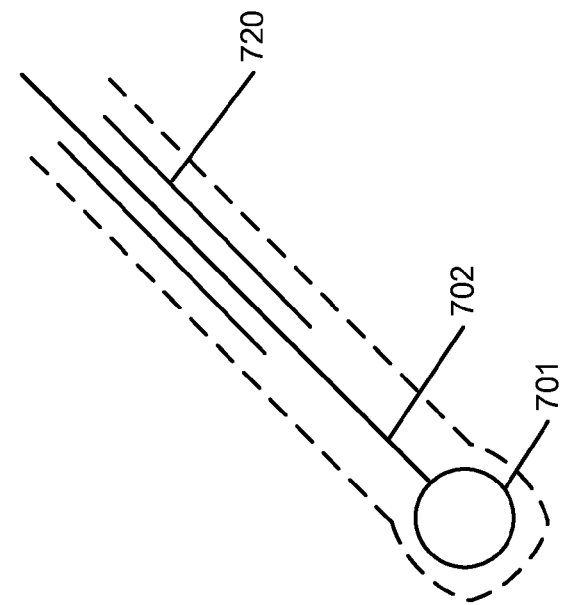

According to another embodiment, instead of using double shielding (e.g., shielding 710 and 720), a single ground shielding can be utilized as shown in FIGS. 7D-7F. In one embodiment, the tip portion configurations as shown in FIGS. 7D-7F can be utilized with the circuit as shown in FIG. 8 described below, where an output of the circuit is not coupled to the stylus body.

Figure 8:
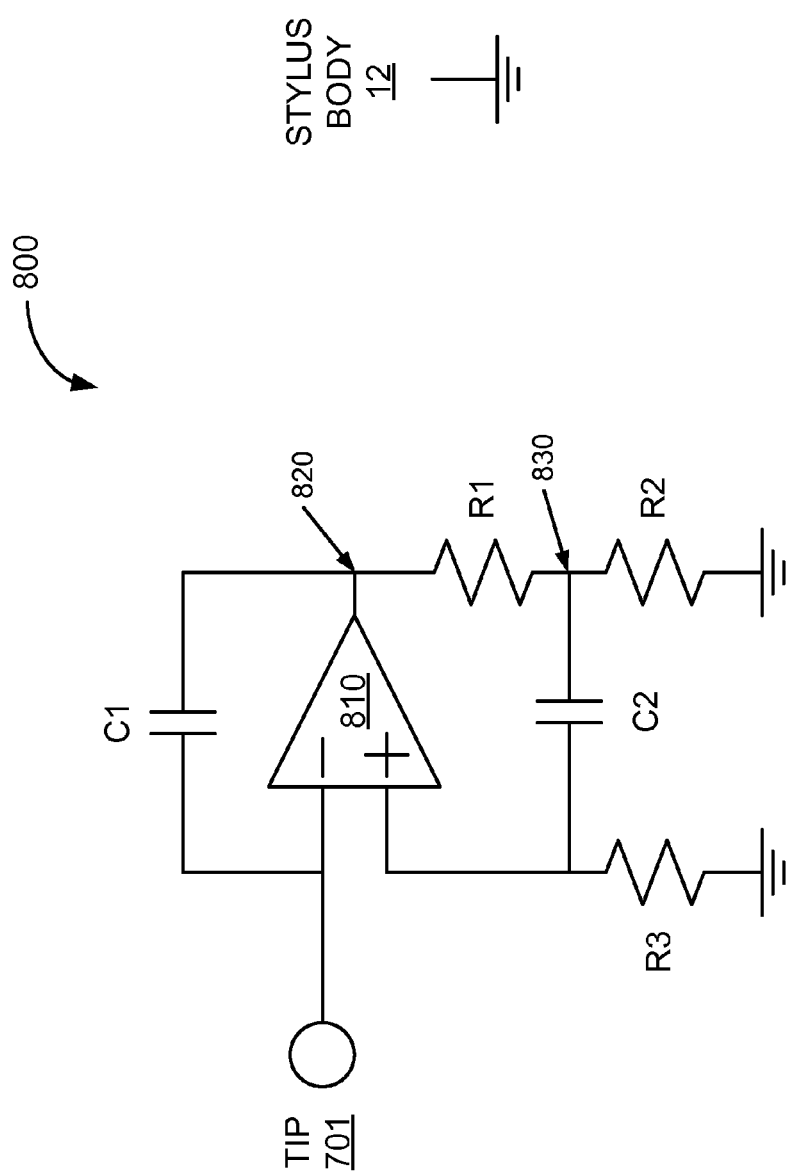
FIG. 8 is a schematic diagram illustrating an example of stylus circuit according to another embodiment of the invention.

FIG. 8 is a schematic diagram illustrating a stylus circuitry according to another embodiment of the invention. Circuit 800 may be implemented as part of circuitry 14 of FIG. 1. Circuit 800 represents a combination of an integrator and an amplifier. Unlike using a separate integrator and amplifier as shown in FIGS. 2A and 2B, circuit 800 utilizes a single op-amp with a positive feedback loop. In this example, a single op-amp is utilized with a capacitor coupled to a negative input and an output of the op-amp, forming an integrator, while at least one resistor coupling the output and a positive input of the op-amp may set the amount of a positive feedback. In one embodiment, circuit 800 includes an integrating amplifier circuit coupled to the supporting rod to integrate and amplify a current induced at the tip. The integrating amplifier circuit includes an operational amplifier (op-amp) having a negative input coupled to the tip, a first capacitor coupled to the negative input and an output of the op-amp to integrate charges induced at the tip, a first resistor coupled to the output of the op-amp, and a second capacitor coupled to the first resister and a positive input of the op-amp.

Referring to FIG. 8, in one embodiment, circuit 800 includes an op-amp 810 having a negative input coupled to tip 701 and a first capacitor C1 coupled to an output 820 and the negative input of op-amp 810. In addition, a first resistor R1 is coupled in series with output 820 and a second resistor R2, forming an intermediate node 830. The other end of R2 is coupled to the ground, which is electrically coupled to stylus body 12. A second capacitor C2 is coupled to node 830 and a positive input of op-amp 810 and a third resistor R3 is coupled to the positive input of op-amp 810 and the ground. In this embodiment, resistors R1, R2, and R3, as well as capacitor C2, form a positive feedback path from output 820 back to the positive input of op-amp 810. The overall gain of circuit 800 is determined based on the coupling capacitance from the touchscreen to the tip, C1, R1, and R2. This circuit uses just one op amp instead of two. It reduces the complexity of the conductive housing of the stylus. If the stylus is to be powered not by a battery but by a power cord feeding in AC or DC from a wall "black cube" power supply then this circuit eliminates the need to have the stylus circuit ground floating with respect to all wires in that power cord.

In one embodiment, the charge induced at tip 701 by a positive-going transition of a touch screen drive line may integrate onto the capacitor C1, which may drive the op-amp output 820 in a negative direction. The positive feedback network (e.g., formed by R1, R2, and C2) may regeneratively amplify a change at the op-amp output 820, possibly causing the op-amp output 820 to swing further negatively in a certain amount. This swing may couple back through the capacitor C2 to the tip 701, which may bring the tip voltage a certain amount lower than before the drive line transition. Thus, the negative-going change at the tip 701 caused by a positive-going drive line transition may be able to effect the "sensing" of an electronic stylus by the touchscreen.

In one embodiment, C1 may be approximately 5 pF; R1 may be approximately 1 kΩ; R2 may be approximately 2.5 kΩ; C2 may be approximately 100 nano-farads (nF); and R3 may be approximately 1000 kΩ. In one embodiment, circuit 800 may be utilized in conjunction with tip portion assembly as shown in FIG. 7D. The circuit 800 ground may be coupled to ground shield 720 of FIG. 7D.

Figure 9:
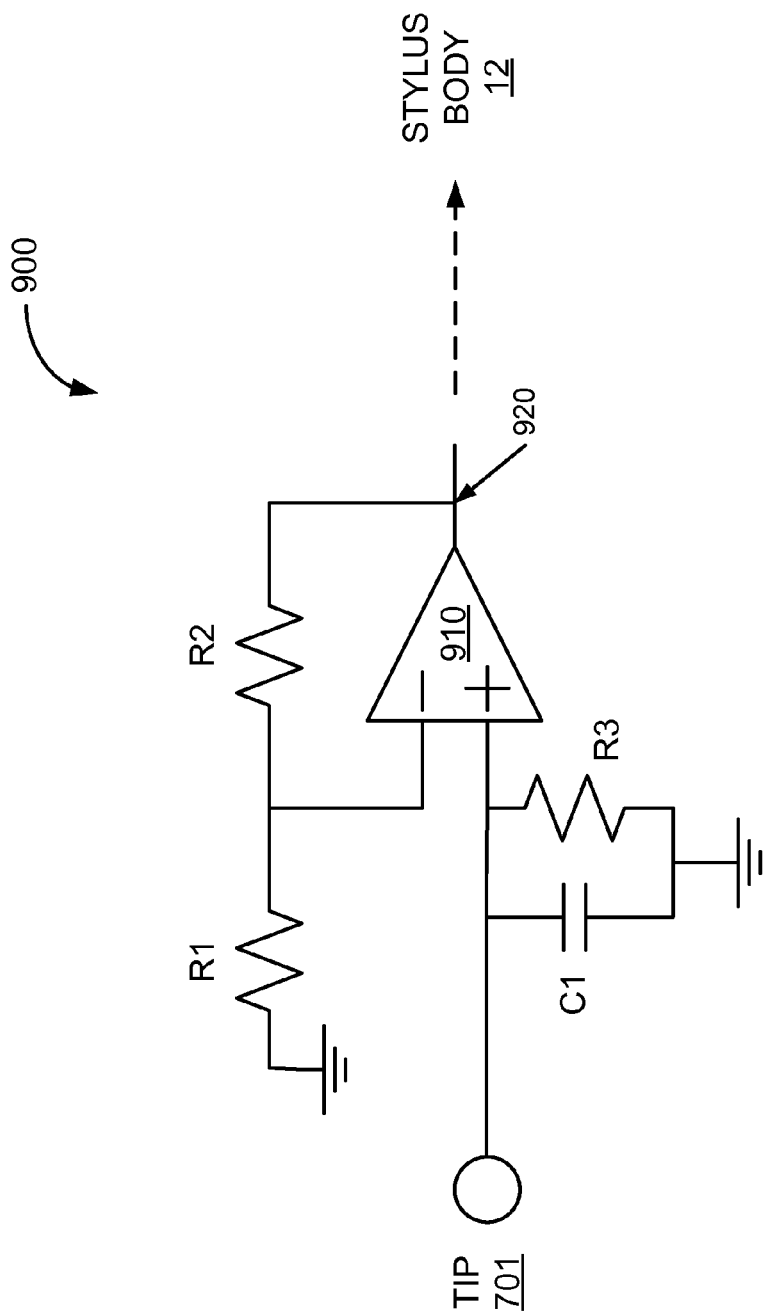
FIG. 9 is a schematic diagram illustrating an example of stylus circuit according to another embodiment of the invention.

FIG. 9 is a schematic diagram illustrating a stylus circuit according to another embodiment of the invention. Circuit 900 may be implemented as part of stylus circuitry 14 of FIG. 1. In one embodiment, circuit 900 includes an integrating amplifier circuit coupled to the supporting rod to integrate and amplify a current induced at the tip. The integrating amplifier circuit includes an operational amplifier (op-amp) having a positive input coupled to the tip, a capacitor is coupled to the positive input and a ground of the op-amp to integrate charges induced at the tip, a first resistor coupled to the output of the op-amp and a negative input of the op-amp, and a second resistor coupled to the negative input of the op-amp and the ground.

Referring to FIG. 9, in this embodiment, stylus circuit 900 includes a non-inverting single op-amp 910 that may amplify the voltage induced onto capacitor C1 by drive line transitions from tip 701. Resistors R1 and R2 may set the gain of the non-inverting op-amp 910, while the stylus body 12 may be electrically coupled to the op-amp output 920. The gain of the amplifier may be determined as (1+R2/R1). In one embodiment, R1 is approximately 1 kΩ; R2 is approximately 3 kΩ; R3 is approximately 20 mega-ohms (mΩ); and C1 is approximately 2.5 pF.

According to certain embodiments, an electronic stylus may include a current-input voltage-output amplifier with one stage of integration. The capacitive touch screens that a stylus may be designed to work with may have different inherent sensitivities. Thus, it may be possible that the amplification of the stylus may need to vary depending on the touch screen the stylus working with. Amplifiers, in general, may oscillate if provided with enough feedback from the output to the input. The feedback path of interest may be the capacitance of the human body holding the stylus to the bulk of the tablet computer, in series with the capacitance of the bulk of the tablet computer to the input tip of the stylus. One may operate the stylus in the region where the closed loop gain, composed of the feedback gain times the internal gain, may be less than that which will produce oscillation (less than 1).

In some embodiments, the stylus may work satisfactorily with a given touch screen if the closed loop gain is slightly below that which will cause oscillation of the stylus-human-tablet system. In one example, a manual way of setting the gain of the stylus would be to place the stylus tip against the touch screen with the gain at maximum, causing oscillation, then reduce the gain to the point that oscillation ceases. In this example, one may want to slide the tip around the touch screen to check that no oscillation occurs, as the various internal metal components of the tablet computer change the coupling to the tip depending on location on the screen. In another embodiment, the process of adjusting the internal gain of the stylus to an amount slightly below that which produces oscillation of the system could be automated. In this embodiment, the stylus may include a gain setting element which could be electronically varied in its value. Additionally the stylus of the illustrative embodiment may include a way to detect oscillation and a logic or state machine to carry out the possible steps involved in reducing the loop gain until the oscillation ceases.

Figure 10A:
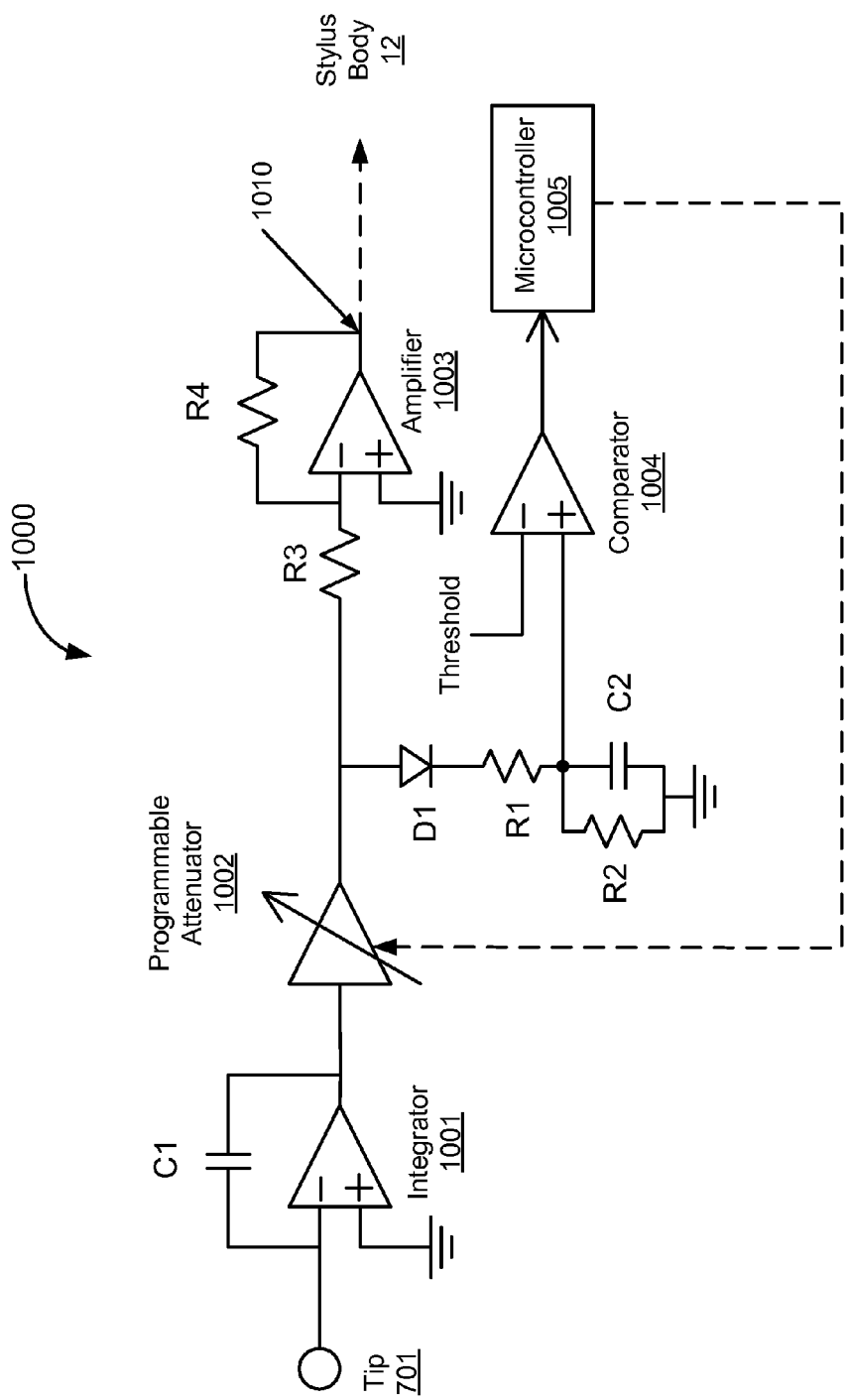
FIGS. 10A and 10B are schematic diagrams illustrating an example of stylus circuit according to certain embodiments of the invention.

FIG. 10A is a schematic diagram illustrating a stylus circuit according to another embodiment of the invention. Circuit 1000 may be implemented as part of stylus circuitry 14 of FIG. 1. In this embodiment, stylus circuit 1000 employs an automatic gain control mechanism. In one embodiment, circuit 1000 includes an integrating amplifier circuit coupled to the supporting rod to integrate and amplify a current induced at the tip. The integrating amplifier circuit includes an inverting integrator having a negative input coupled to the tip to charge a current induced at the tip, a programmable attenuator coupled to an output of the inverting integrator, a control circuit coupled to the programmable attenuator to control a gain of the programmable attenuator in response to an output of the programmable attenuator, and an inverting amplifier coupled to an output of the programmable attenuator.

Referring to FIG. 10A, circuit 1000 includes an integrator 1001, a programmable attenuator 1002, an inverted amplifier 1003, and a microcontroller 1005. Tip 701 is coupled to an input of integrator 1001 whose output is coupled to an input of programmable attenuator 1002. Amplifier 1003 is configured to amplify the output signal from an output of the programmable attenuator 1002, where an output of amplifier 1003 may be coupled to the stylus body 12. In addition, microcontroller 1005 is configured to monitor the output of programmable attenuator 1002 and provide a feedback, represented by a dash line, to control the gain of the programmable attenuator 1002.

In one embodiment, programmable attenuator 1002 may be configured to adjust or modify the gain. Microcontroller 1005 having executable code running therein may be used to control the overall system. Additionally, the stylus circuit may include a circuit to detect oscillation using a rectifier D1, a combination attenuator and low pass filter formed by R1, R2, and C1, and an analog comparator 1004.

When the circuit 1000 is oscillating, output 1010 may be swinging between the power supply rails. When the circuit 1000 is not oscillating, deviations of the output 1010 away from ground may be periodic short bursts of pulses when the nearest touch screen drive lines are pulsing. Thus, a stylus which rectifies via D1 the integrated input signal and smoothes the integrated input signal (from integrator 1001) with a low pass filter (e.g., R1, R2, and C1) may produce an output of the low pass filter that may be close to zero when no oscillation is occurring. However, the output 1010 may be substantially higher in the case of oscillation. Thus, analog comparator 1004 with an appropriately set threshold voltage may change the state when oscillation starts or stops. The logic output of the comparator 1004 may be the signal which the program of microcontroller 1005 uses to determine whether to decrease the overall circuit gain. In another embodiment, when the circuit is turned on, the microcontroller 1005 may set the circuit gain to maximum. Thus, when the tip is placed against the touchscreen surface and oscillation commences, the microcontroller 1005 may slowly reduce the gain until oscillation ceases and the stylus operates normally. In one embodiment, C1 of integrator 1001 is approximately 5 pF. D1 may be a 1N4148 compatible diode. The op-amps may be LT1360 compatible op-amps available from Linear Technologies®. R1 is approximately 10 kΩ. R2 is approximately 10 kΩ. C2 is approximately 1 micro-farad (μF). R3 is approximately 1 kΩ. R4 is approximately 15 kΩ.

Figure 10B:
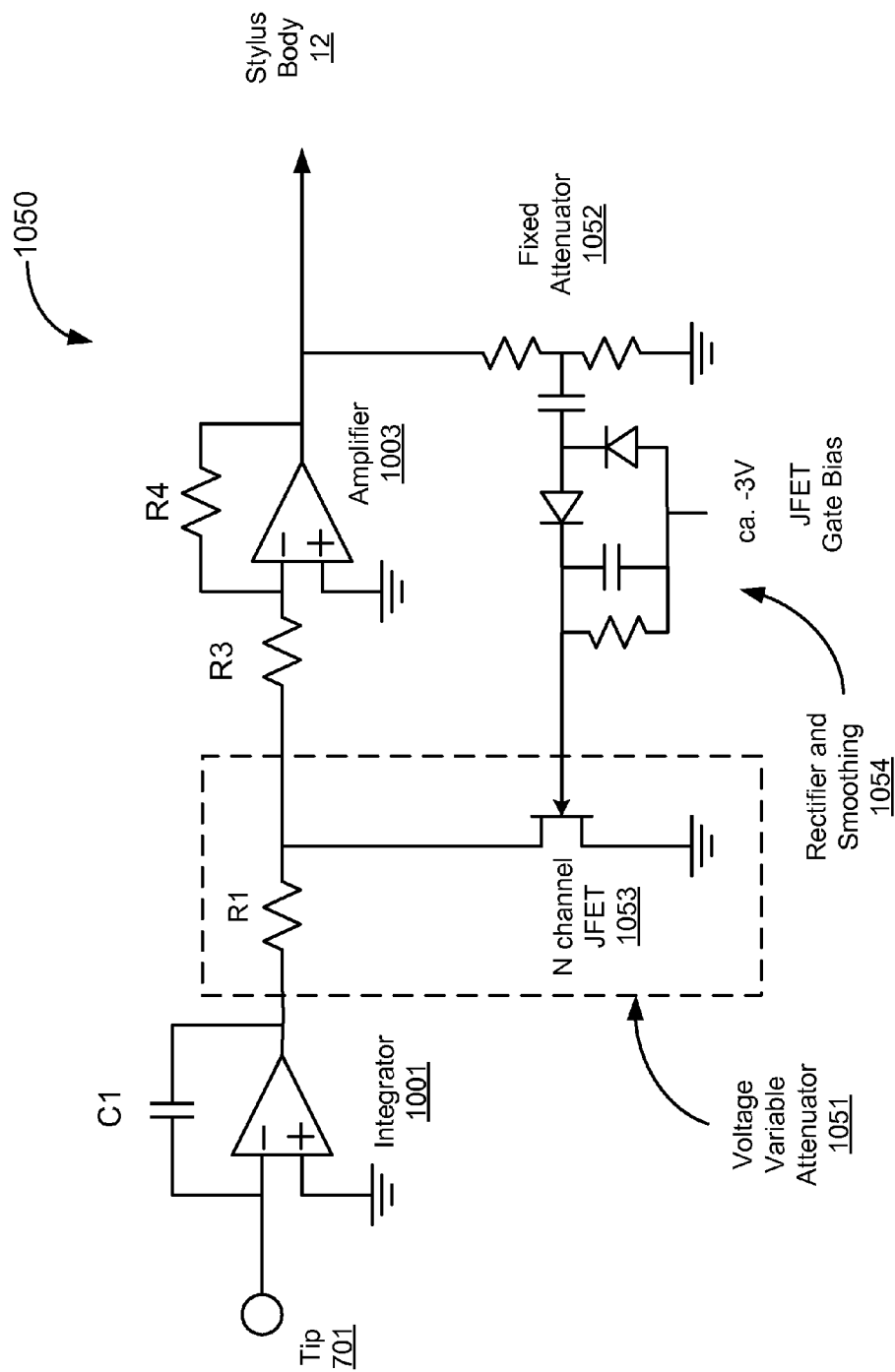

FIG. 10B is a schematic diagram illustrating a stylus circuit according to another embodiment of the invention. Circuit 1050 may be implemented as part of stylus circuitry 14 of FIG. 1. In this embodiment, the automatic gain control (AGC) function can also be implemented in an all-analog fashion. The analog AGC uses the same principle of operation as the digital AGC as described in FIG. 10A, which is to initialize the gain control element at minimum attenuation and thereby allow the stylus-human-tablet system to break into oscillation when the stylus tip first touches the touch screen. The oscillation is detected and the attenuation increased until the oscillation stops, leaving the stylus gain at roughly the maximum for useful operation.

A junction field effect transistor (JFET) 1053 is used as a gain control element. When operating its linear region the JFET 1053 can be viewed as a voltage-variable resistance. Using this resistance as part of a resistive voltage divider operates as a voltage-variable attenuator 1051. Biased into this region the drain-source current will be approximately proportional to the drain-source voltage for a drain-source voltage, of either polarity, up to about 1 volt. For an N channel JFET the drain-source resistance decreases with increasing gate-source voltage.

When the stylus is powered on the gate of the N channel JFET 1053 is at the same voltage as the source so the drain-source resistance is very high. This results in minimum attenuation for the resistive voltage divider formed with R1, allowing the stylus to break into oscillation when the tip first touches the screen. This oscillation, as sampled at the output of the second amplifier 1003, will have an amplitude of perhaps 10 volts. However, a variation of the gate-source voltage of just a few volts will change the JFET resistance dramatically, perhaps by a factor of 10. Therefore the relatively higher voltage swings of the stylus output must be reduced to control the JFET resistance effectively. A fixed attenuator 1052 accomplishes that. The AC voltage at the output of the fixed attenuator 1052 is rectified and smoothed by rectifying and smoothing circuit 1054, providing a DC control voltage at the gate of the JFET 1053. In one embodiment, rectifying and smoothing circuit 1054 includes a rectifier and an RC low-pass filter. The initial stylus oscillation results in the gate voltage of the JFET 1053 rapidly increasing, decreasing the JFET drain-source resistance and increasing the attenuation of the voltage divider formed with R1. This results in a rapid reduction of the stylus gain and ceasing of oscillation, leaving the stylus in its useful operating state.

As mentioned above, in some situations, the gain of an electronic stylus circuit needs to be varied some from one touch screen to another touch screen. Too low a gain setting and the stylus may not register with the touch screen, and too high a gain setting and the overall tablet-stylus-human system may oscillate. Also, different touch screens, when used with the stylus, may exhibit various amounts of "wiggle," a term describing inaccurate coordinate registration. The need to adjust the gain of the stylus to suit different touch screens may be due in part to the overall stylus tip to touch screen coupling capacitance being different from one screen to another. The wiggles may be due in part to the coupling capacitance varying from spot to spot on a given touch screen. According to one embodiment, a stylus with gain compression may mitigate both of these non-ideal aspects of the stylus.

The overall system of the capacitive touch screen of a tablet computer, an electronic stylus and the human holding the stylus, form a closed loop capacitively coupled electrical circuit, as shown in FIG. 3. The coupling capacitances involved are relatively small, around 1 pF capacitance between the touch screen electrodes and the stylus tip. The coupling capacitances may be relatively large, around 50 pF capacitance between the human holding the stylus and the bulk of the touch screen. Since this is a series circuit the large human-tablet capacitance can be viewed as being in series with the 1 pF touch screen to stylus tip capacitance. These two capacitances in series are effectively a capacitance very slightly smaller than 1 pF capacitance. So the system can be viewed as composed of just the tablet computer and the stylus, with the output of the stylus connected to some average potential of the tablet computer.

Figure 11A:
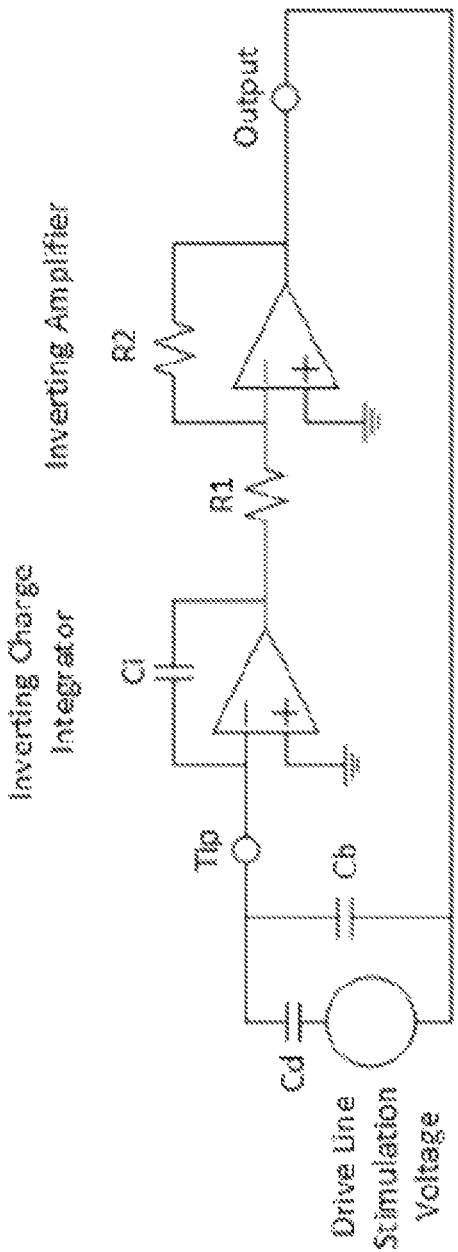
FIGS. 11A and 11B are diagrams illustrating gain effects of a stylus circuit.

An electronic stylus as described above typically has an inverting charge integration stage followed by an inverting voltage gain stage, as shown in FIG. 11A. Referring to FIG. 11A, the overall voltage gain of this loop can be obtained by multiplying the voltage gain from the stylus output to the output of the charge integrator times the voltage gain of the inverting amplifier. The former is approximately $$-(Cd+Cb)/Ci$$

where Cd is the coupling capacitance from a drive line to the tip and Cb is the coupling capacitance from the bulk of the tablet computer and sense lines to the tip. In practice, the magnitude of this gain is considerably less than 1, perhaps approximately 0.2.

The voltage gain of the inverting amplifier is $-R2/R1$, In practice, this gain is greater than 1, perhaps $-4$. Hence the overall loop gain is $$\frac{Cd + Cb}{Ci} \frac{R2}{R1}$$

If this positive quantity is less than 1, the loop cannot break into oscillation. This is the desired operating regime of the loop. An initial voltage step at a drive line is capacitively coupled to the tip and produces some $\Delta$Vo at the stylus output. This step feeds back to the input and is amplified with the overall loop gain above. If this overall loop gain is referred to as "r," then the twice amplified step at the output of the stylus will be $\Delta$Vo(1+r). As this initial step cycles around and around the loop, integrating onto Ci and accumulating a factor of r in amplitude each cycle, the stylus output will approach the sum of $$\Delta Vo(1 + r + r^2 + r^3 + \dots) = \Delta Vo \frac{1}{1-r}$$

Figure 11B:
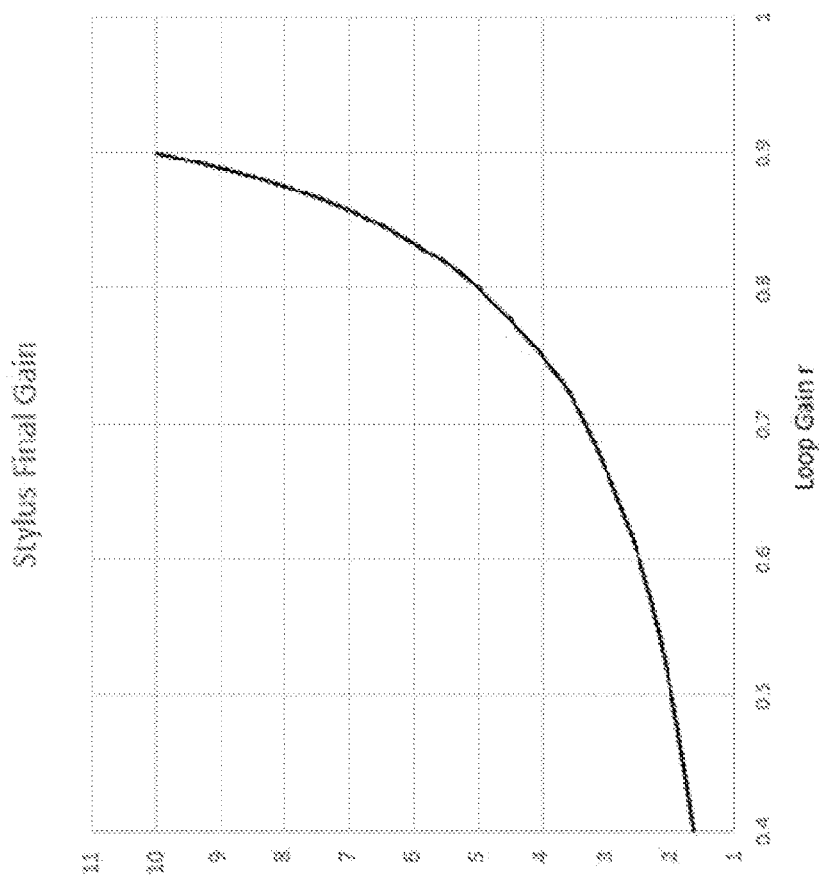

It can be seen that when r is close to 1, this final output voltage of the stylus is a very strong function of r. The stylus' final output gain, as a function of the loop gain r, is shown in FIG. 11B.

In order for the small coupling capacitance from stylus tip to touch screen to suffice for proper operation, the final stylus gain must be high. However, this is the region of r where the variation with r is very strong. The only non-constant term in the expression above for r is the tip to screen total coupling capacitance (Cd+Cb). A small increase in this quantity will increase r and hence greatly increase the final stylus gain.

For a given screen, this coupling capacitance can vary significantly from spot to spot depending on what electrodes are nearby. This variation causes the output voltage of the stylus to vary a large amount from spot to spot. Since the charge induced in the sense lines of the touch screen is proportional to the output voltage of the stylus, these large variations in the output voltage cause the centroid finding algorithm in the touch screen chipset within the tablet computer to give erroneous results. This contributes to the wiggles effect.

Looking from one screen to the next, the coupling capacitance (Cd+Cb) will be different in general. Hence the final stylus gain will be different, necessitating a change in R2 to get r in the right range. It is important to reduce the variation of the final stylus gain with the coupling capacitance. The positive feedback nature of the system, where an increase in the output voltage leads to another, but smaller, increase in the output voltage, suggests that limiting the recycling voltage step at any point in the loop would reduce the final stylus gain. According to one embodiment, one circuit topology having a limiting or clipping stage can be utilized to significantly reduce the variation of overall final stylus gain with coupling capacitance.

Figure 12A:
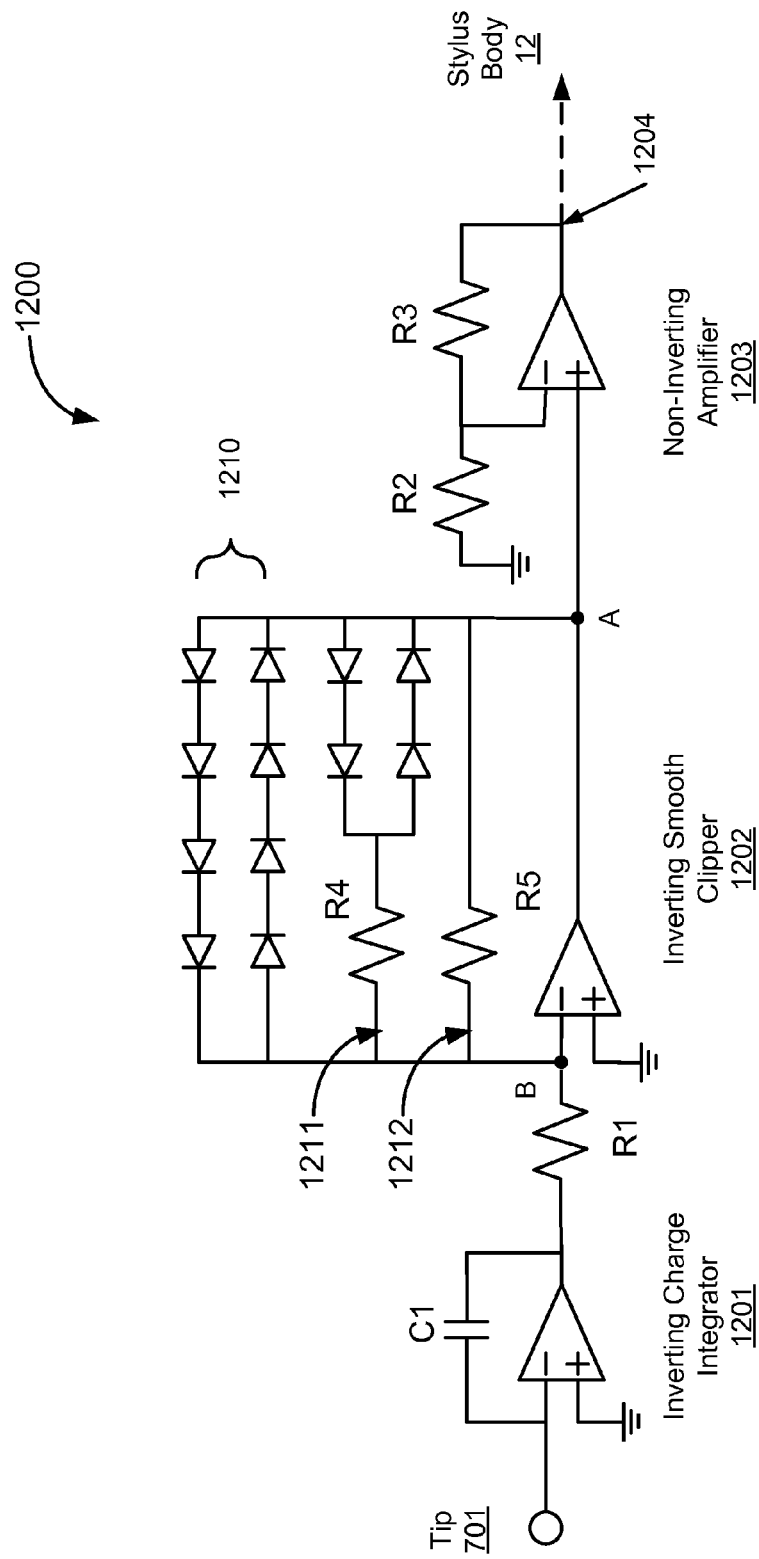
FIGS. 12A and 12B are diagrams illustrating gain effects of a stylus circuit having a smooth clipper circuit according to one embodiment of the invention.

FIG. 12A is a schematic diagram illustrating a stylus circuit having a clipping circuit according to one embodiment of the invention. Circuit 1200 may be implemented as part of stylus circuitry 14 of FIG. 1. Referring to FIG. 12A, circuit 1200 includes an inverting charge integrator 1201 whose input is coupled to tip 701, an inverting smooth clipper circuit 1202, and a non-inverting amplifier 1203 in series. The output 1204 of circuit 1200 may be coupled to the stylus body of a stylus, such as stylus body 12 of FIG. 1. Note that integrator 1201 and amplifier 1203 can be replaced with any of the integrators and amplifiers described above.

The inverting smooth clipping circuit 1202 in this configuration uses diodes (e.g., 1N4148), each having a forward voltage drop of about 0.5 volts (V) for the purpose of illustration, to reduce the stage gain at a node A voltage of approximately $\pm 1.0$ V (due to two diodes in series) and then sharply limit the stage output voltage to about $\pm 2.0$V (due to 4 diodes in series). When a drive line voltage step occurs and the recycling step reaches these thresholds the effect on the stylus output voltage is reduced and less of the recycled step is fed back to the input.

Referring to FIG. 12A, the feedback loop between node A and node B of clipper circuit 1202 includes multiple paths, in this example, paths 1210-1212. During the normal operations, when the voltage difference between node A and node B is less than 1.0 V (e.g., forward voltage drops of two diodes in series of path 1211) due to the gain of clipper circuit 1202, paths 1210-1211 are not turned on. The gain of clipper circuit 1202 is determined based on R1 and R5 (e.g., approximately R5/R1). When the voltage difference between node A and node B is greater than 1.0 V but less than 2.0 V, paths 1211-1212 are turned on while path 1210 is still turned off. In this scenario, the gain of clipper circuit 1202 is determined based on R1, R4, and R5 (e.g., (R4||R5)/R1), where R4 now in parallel with R5 reduces the overall gain of clipper circuit 1202. When the voltage difference between node A and node B is greater than 2.0 V (e.g., forward voltage drop over 4 diodes in series), all paths 1210-1212 are turned on. Since the forward impedance of a diode is significantly small compared to resisters R4 and R5, path 1210 will impose an almost short circuit effect on clipper circuit 1202, which leads to a very small gain, dependent upon the impedance of the diodes.

Figure 12B:
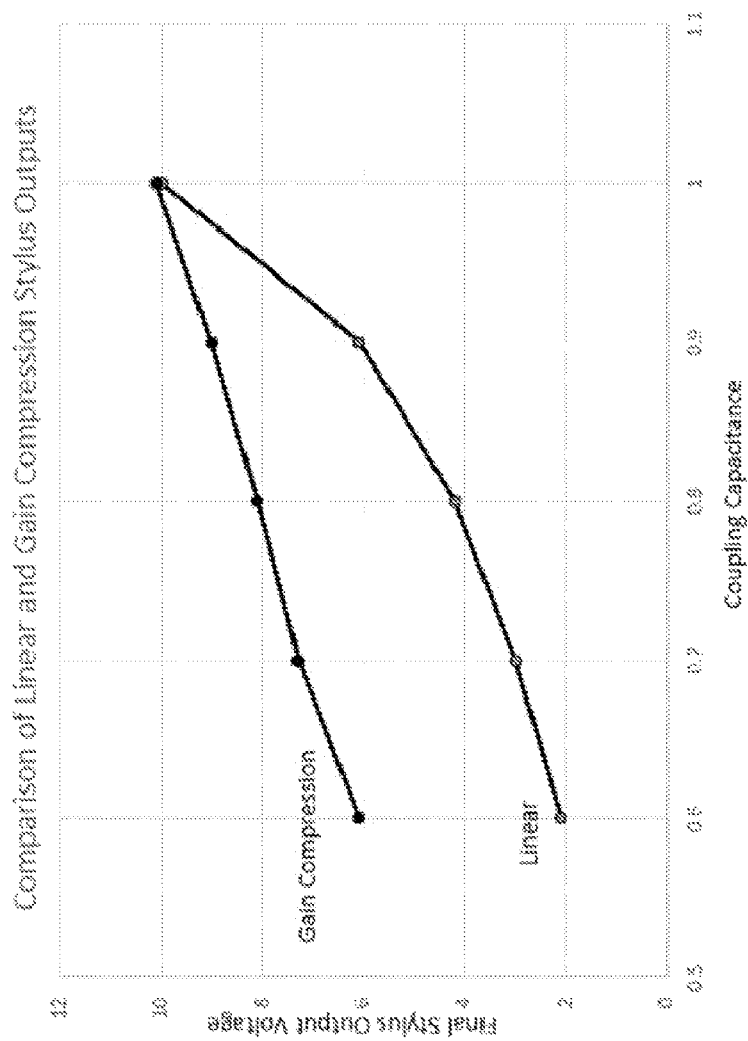

In one embodiment, any of the op-amps as shown may be an LT1360 compatible op-amp available from Linear Technologies and any of the diodes as shown may be a 1N4148 compatible diode. C1 is approximately 4 pF. R1 is approximately 2.4 k$\Omega$. R2 is approximately 1 k$\Omega$. R3 is approximately 2.7 k$\Omega$. R4 is approximately 1 k$\Omega$. R5 is approximately 2 k$\Omega$. FIG. 12B shows a comparison of the simulated final outputs of a linear and gain compression stylus over a range of input coupling capacitances. Over this range the linear stylus' output varies by a factor of 5, while the gain compression stylus' output varies only by a factor of 1.67. This reduction in gain variation can likely be improved upon by more extensive simulation and testing.

Some portions of the preceding detailed descriptions have been presented in terms of algorithms and symbolic representations of operations on data bits within a device memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An electronic stylus to be used with a capacitive touch screen, comprising:
   a tip portion having a tip and a supporting rod attached to the tip, the tip and the supporting rod being electrically conductive, wherein the tip portion further includes
   a first electrical shielding tube enclosing and shielding the supporting rod, and
   a second electrical shielding tube enclosing the first electrical shielding tube and the supporting rod;
   a circuit coupled to the supporting rod to integrate and amplify a current induced at the tip, the circuit comprising a non-inverting integrator circuit and coupling an integrated non-inverted signal from the tip to the second electrical shielding tube; and
   an electrically conductive housing to house the circuit therein, wherein the first electrical shielding tube and the second electrical shielding tube are to reduce skew effect between the supporting rod and a surface of a touch screen when the electronic stylus is held against the surface of the touch screen.

2. The electronic stylus of claim 1, wherein an output of the circuit is coupled to the second electrical shielding tube, while a ground of the circuit is coupled to the first electrical shielding tube.

3. The electronic stylus of claim 1, wherein the tip of the tip portion comprises a ring.

4. The electronic stylus of claim 3, wherein the ring is coupled to the supporting rod in a predetermined angle, such that when the electronic stylus is held in a writing position with respect to the touch screen, a cross surface of the ring is relatively parallel with the surface of the touch screen.

5. The electronic stylus of claim 1, wherein the circuit comprises:
   a first operational amplifier (op-amp) having a negative input coupled to the tip;
   a first capacitor coupled to the negative input and an output of the first op-amp to integrate charges induced at the tip;
   a first resistor having a first end coupled to the output of the first op-amp; and
   a second op-amp having a second end of the first resistor coupled to a negative input of the second op-amp and a second resistor coupled to the negative input of the second op-amp and an output of the second op-amp.

6. The electronic stylus of claim 1, wherein the circuit further comprises:
   a first operational amplifier (op-amp) having a negative input coupled to the tip;
   a first resistor coupled between the negative input and an output of the first op-amp;
   a second resistor having a first end coupled to the output of the first op-amp; and
   a second op-amp having a second end of the resistor coupled to a negative input of the second op-amp and a capacitor coupled between the negative input and an output of the second op-amp.

7. The electronic stylus of claim 1, wherein an output of the inverting amplifier is coupled to the electrically conductive housing.

8. The electronic stylus of claim 7, wherein the non-inverting integrated amplifier circuit comprises a negative capacitance.

9. An electronic stylus to be used with a capacitive touch screen, comprising:
   a tip portion having a tip and a supporting rod attached to the tip, the tip and the supporting rod being electrically conductive;
   a non-inverting integrating amplifier circuit coupled to the supporting rod to integrate and amplify a current induced at the tip, wherein the integrating amplifier circuit comprises a first operational amplifier (op-amp) having a negative input coupled to the tip, a first resistor having a first end coupled to an output of the first op-amp and a second op-amp having a negative input coupled to a second end of the first resistor;
      wherein one of the first op-amp and the second op-amp having a capacitor coupled between the respective first or second op-amp's negative input and its output; and
      wherein another of the first op-amp and the second op-amp having a resistor coupled between the respective first or second op-amp's negative input and its output;
   a power supply circuit having a battery to provide power to the non-inverting integrating amplifier circuit; and an electrically conductive housing to house the non-inverting integrating amplifier circuit and the power supply circuit.

10. The electronic stylus of claim 9, wherein the tip of the tip portion comprises an electrically conductive ring.

11. The electronic stylus of claim 10, wherein the electrically conductive ring is coupled to the supporting rod in a predetermined angle, such that when the electronic stylus is held in a writing position with respect to the touch screen, a cross surface of the electrically conductive ring is relatively parallel with the surface of the touch screen.

12. An electronic stylus to be used with a capacitive touch screen, comprising:
a tip portion having a tip and a supporting rod attached to the tip, the tip and the supporting rod being electrically conductive;
a non-inverting integrating amplifier circuit coupled to the supporting rod to integrate and amplify a current induced at the tip, wherein the non-inverting integrating amplifier circuit comprises:
an inverting integrator having a negative input coupled to the tip to integrate a current induced at the tip,
a gain control circuit coupled to an output of the inverting integrator and to an electrically conductive housing, and
a resistor coupled between an output of the gain control circuit and a negative input of an inverting amplifier;
a power supply circuit having a battery to provide power to the non-inverting integrating amplifier circuit; and
an electrically conductive housing to house the non-inverting integrating amplifier circuit and the power supply circuit.

13. The electronic stylus of claim 12, wherein the gain control circuit comprises:
a comparator to compare a signal received from the output of a programmable attenuator against a predetermined threshold; and
a microcontroller coupled to an output of the comparator to receive a comparison signal and to generate a feedback signal based on the comparison signal to control the gain of the programmable attenuator.

14. The electronic stylus of claim 13, wherein the gain control circuit further comprises:
a rectifier coupled to the output of a programmable attenuator and an input of the comparator to rectify the signal received from the programmable attenuator; and
a low-pass filter coupled to a cathode of the rectifier to filter out high frequency remnants of the rectification process.

15. The electronic stylus of claim 12, wherein the tip of the tip portion comprises a ring.

16. The electronic stylus of claim 15, wherein the ring is coupled to the supporting rod in a predetermined angle, such that when the electronic stylus is held in a writing position with respect to the touch screen, a cross surface of the ring is relatively parallel with the surface of the touch screen.

17. The electronic stylus of claim 12, wherein the gain control circuit comprises one of an automatic programmable attenuator gain control circuit and an automatic analog gain control circuit.

* * * * *